(12) United States Patent
Pappas

(10) Patent No.: US 11,969,113 B2
(45) Date of Patent: Apr. 30, 2024

(54) PACKAGE SECURING SYSTEM AND METHOD FOR USE WITH AUTONOMOUS VEHICLES

(71) Applicant: Cary C Pappas, Collierville, TN (US)

(72) Inventor: Cary C Pappas, Collierville, TN (US)

( * ) Notice: Subject to any disclaimer, the term of this patent is extended or adjusted under 35 U.S.C. 154(b) by 299 days.

(21) Appl. No.: 17/590,606

(22) Filed: Feb. 1, 2022

(65) Prior Publication Data

US 2022/0151420 A1    May 19, 2022

Related U.S. Application Data

(63) Continuation-in-part of application No. 17/003,311, filed on Aug. 26, 2020, now Pat. No. 11,266,262.

(51) Int. Cl.
*A47G 29/14* (2006.01)
*B60W 60/00* (2020.01)

(52) U.S. Cl.
CPC ......... *A47G 29/141* (2013.01); *B60W 60/001* (2020.02); *A47G 2029/145* (2013.01); *A47G 2029/149* (2013.01); *B60W 2420/40* (2013.01)

(58) Field of Classification Search
CPC ............ A47G 29/141; A47G 2029/145; A47G 2029/147; A47G 2029/149; B60W 60/001; B60W 2420/40; H04N 7/185; A47L 23/263; G06Q 10/0836; B64U 2101/64; B64U 2101/66; B64D 1/02; B64F 1/32; B64C 39/024
See application file for complete search history.

(56) References Cited

U.S. PATENT DOCUMENTS

| | | | |
|---|---|---|---|
| 9,211,025 B1* | 12/2015 | Elhawwashy | A47G 29/20 |
| 10,076,204 B1 | 9/2018 | Sadeghi | |
| 10,299,617 B1 | 5/2019 | Castellanos | |
| 10,537,197 B2 | 1/2020 | Hopp | |
| 10,786,104 B1* | 9/2020 | Pappas | A47L 23/266 |
| 10,973,353 B2 | 4/2021 | Parvarandeh | |
| 11,812,878 B1* | 11/2023 | Nevison | H04L 9/0643 |
| 2005/0040954 A1 | 2/2005 | McNally | |
| 2009/0273670 A1 | 11/2009 | Tamayo | |
| 2010/0277328 A1 | 11/2010 | Mullan | |
| 2015/0175276 A1* | 6/2015 | Koster | B64C 39/024 |
| | | | 244/114 R |
| 2016/0051073 A1 | 2/2016 | Heinz | |
| 2016/0331171 A1* | 11/2016 | Jiang | A47G 29/141 |

(Continued)

*Primary Examiner* — William L Miller
(74) *Attorney, Agent, or Firm* — H. Brock Kolls

(57) ABSTRACT

The present invention relates a package securing system comprising a package receptacle having an access door, a web-enabled control system, and a securing tether that is attached to the access door. The securing tether is operationally related to the securing tether actuator and repositions the access door in an open or a closed position. Upon receipt of an authorization, the access door transitions to the open position, by way of the securing tether. The open position allows the package to be inserted or removed from the package receptacle. The package is secured by transitioning the access door to the closed position, by way of the securing tether, after the package has been inserted into the package receptacle. An autonomous vehicle equipped with a vehicle web-enabled control system can make package pickups and deliveries. The autonomous vehicle can be a car, truck, drone, or other autonomous vehicles.

17 Claims, 23 Drawing Sheets

(56) References Cited

U.S. PATENT DOCUMENTS

| | | | |
|---|---|---|---|
| 2017/0147975 A1* | 5/2017 | Natarajan | H04L 63/0876 |
| 2017/0178117 A1 | 6/2017 | McClard | |
| 2017/0286905 A1* | 10/2017 | Richardson | G06Q 10/0836 |
| 2018/0092484 A1* | 4/2018 | Lewis | G08G 5/0026 |
| 2018/0290764 A1* | 10/2018 | Mcmillian et al. | B64U 70/90 |
| 2018/0296016 A1 | 10/2018 | Teoh | |
| 2019/0104876 A1 | 4/2019 | Loures | |
| 2019/0130342 A1 | 5/2019 | Maheshwari | |
| 2019/0133362 A1 | 5/2019 | Gilligan | |
| 2020/0060460 A1 | 2/2020 | Farrar | |
| 2020/0077826 A1 | 3/2020 | Chenier | |
| 2020/0170434 A1 | 6/2020 | Lemieux | |
| 2020/0390260 A1* | 12/2020 | Romanucci | B64F 1/32 |
| 2022/0395124 A1* | 12/2022 | Meddah | G08B 3/10 |
| 2023/0012772 A1* | 1/2023 | Kalathil | A47G 29/30 |

\* cited by examiner

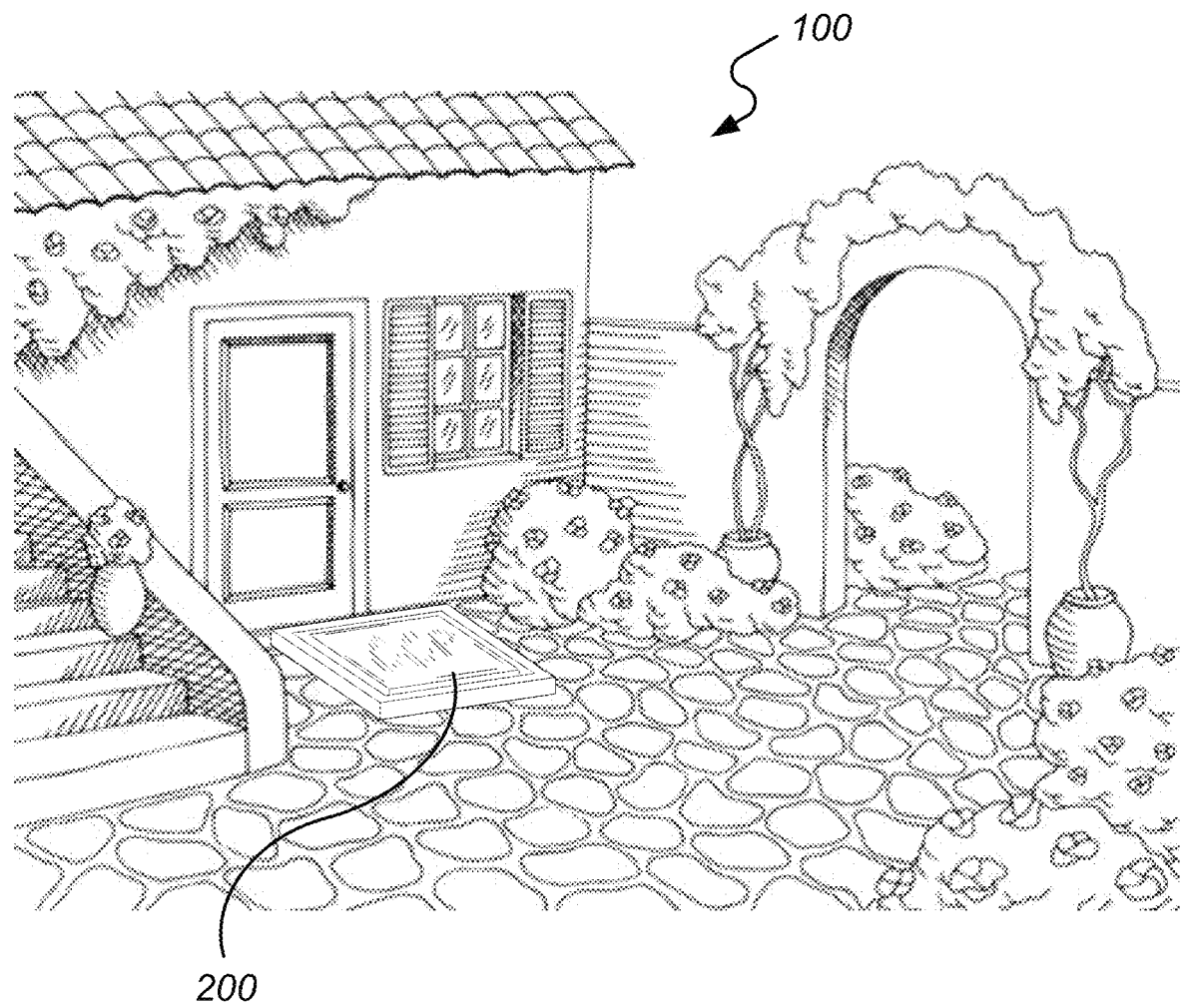
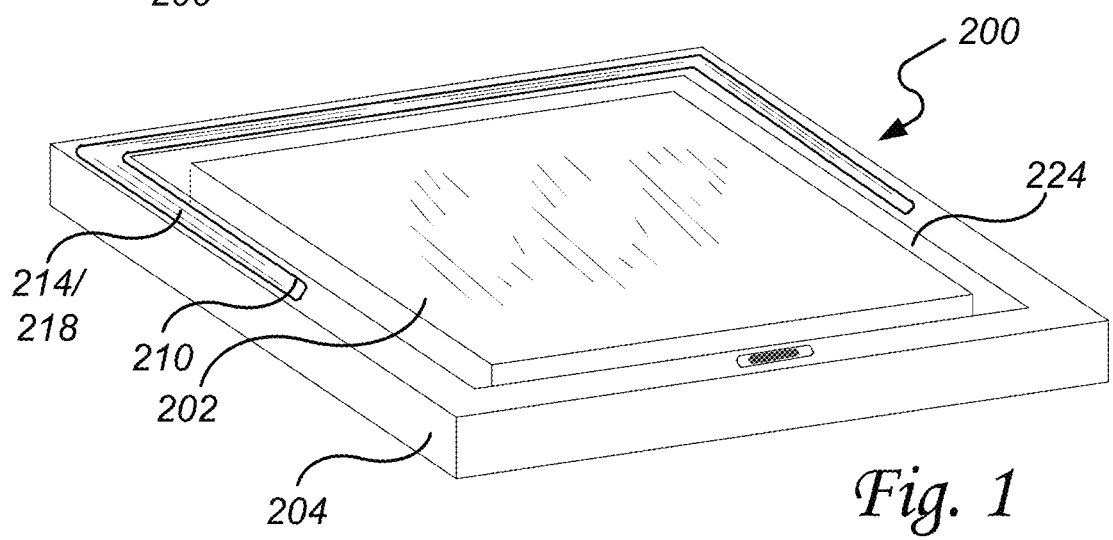
Fig. 1

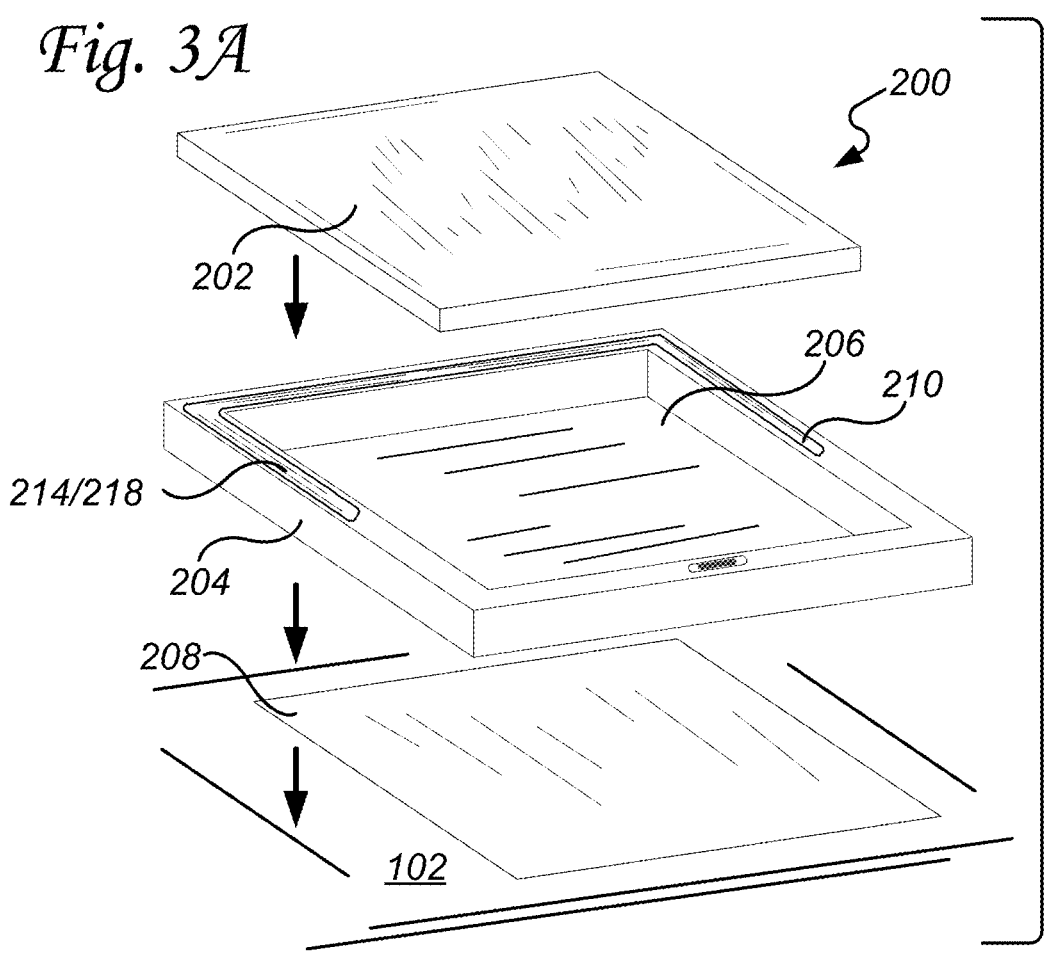
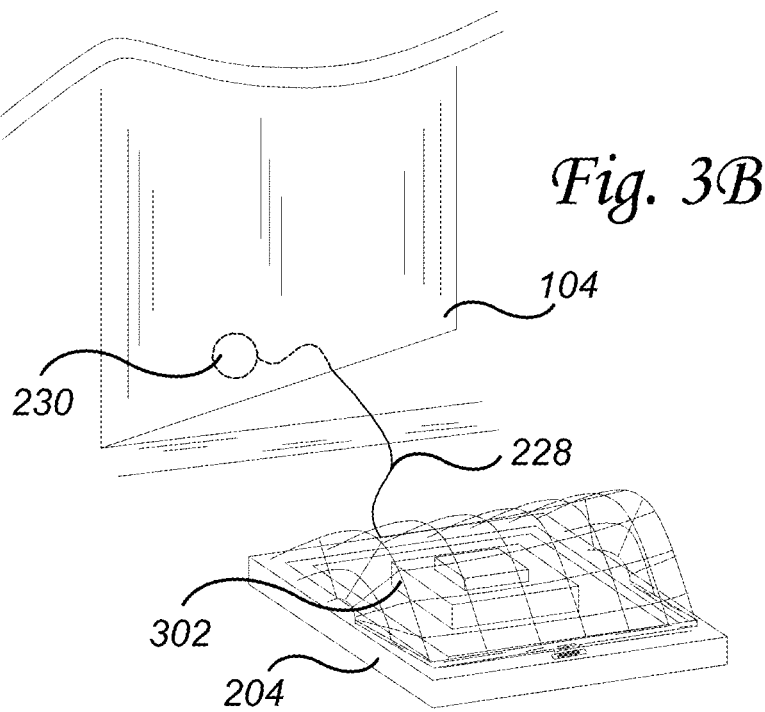

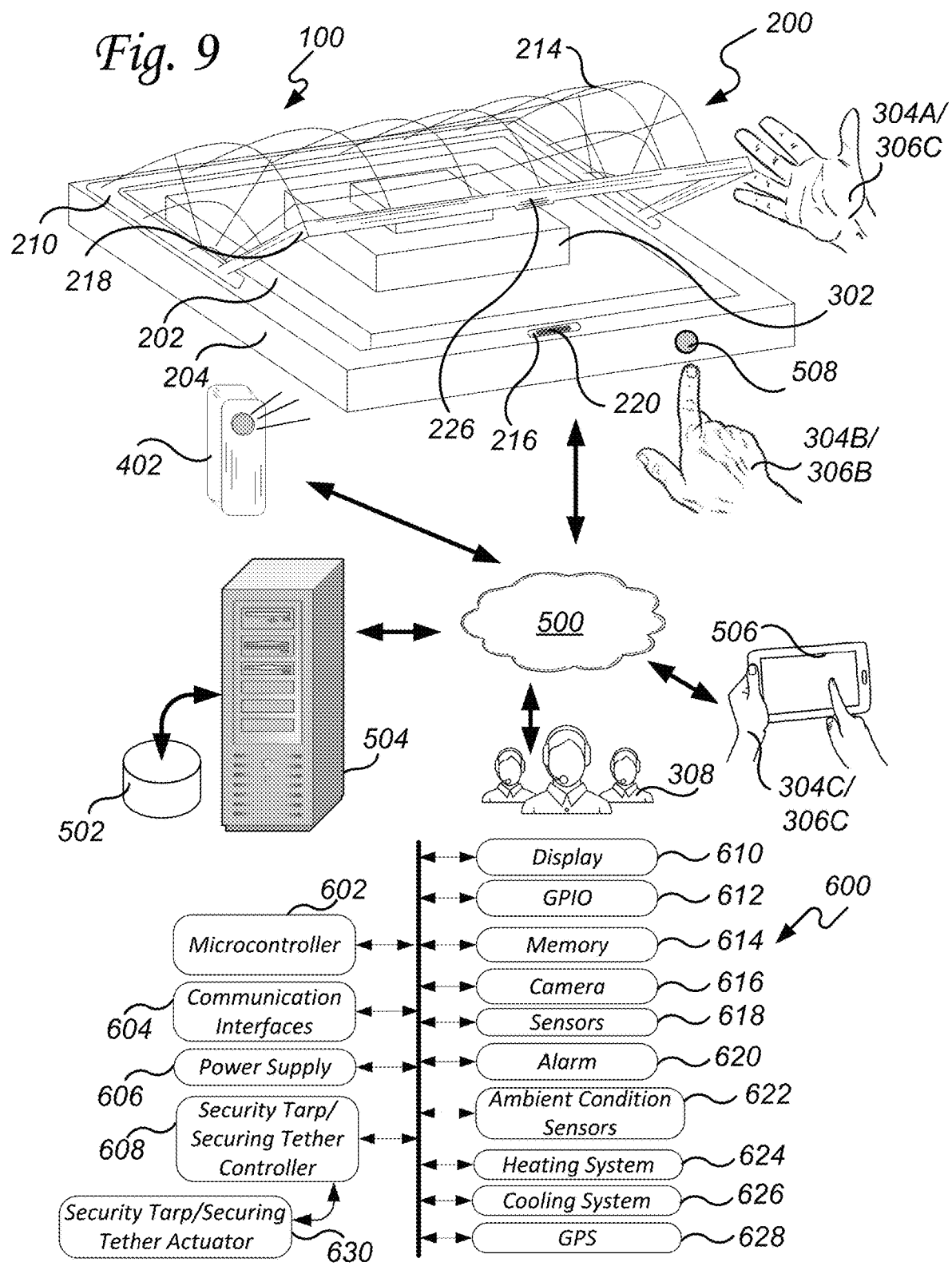

Fig. 20
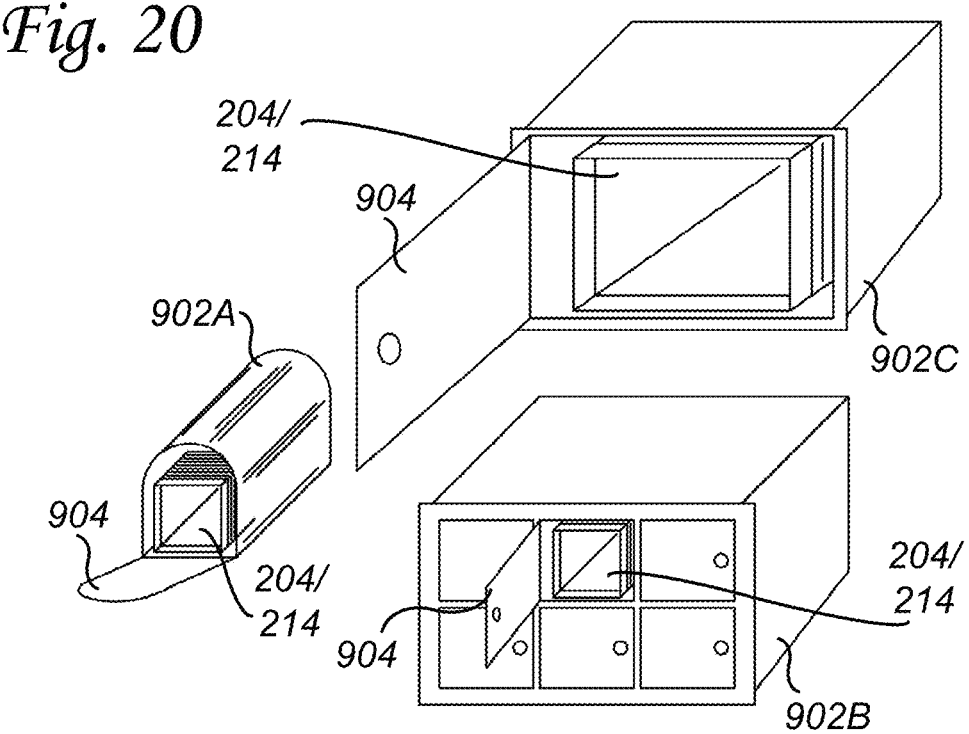
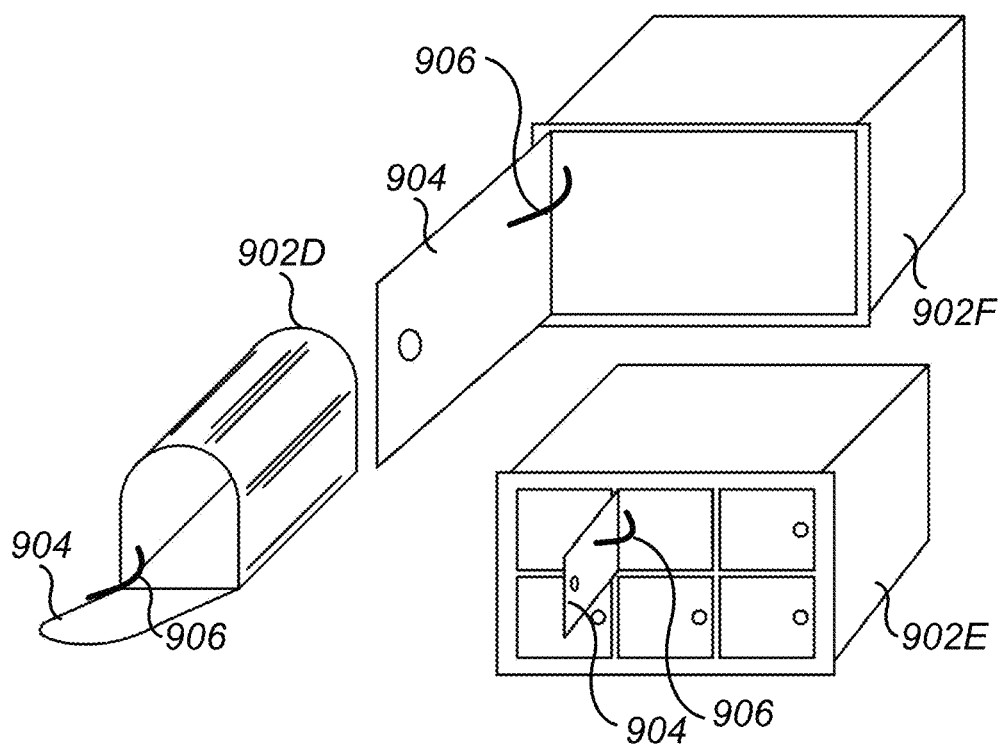

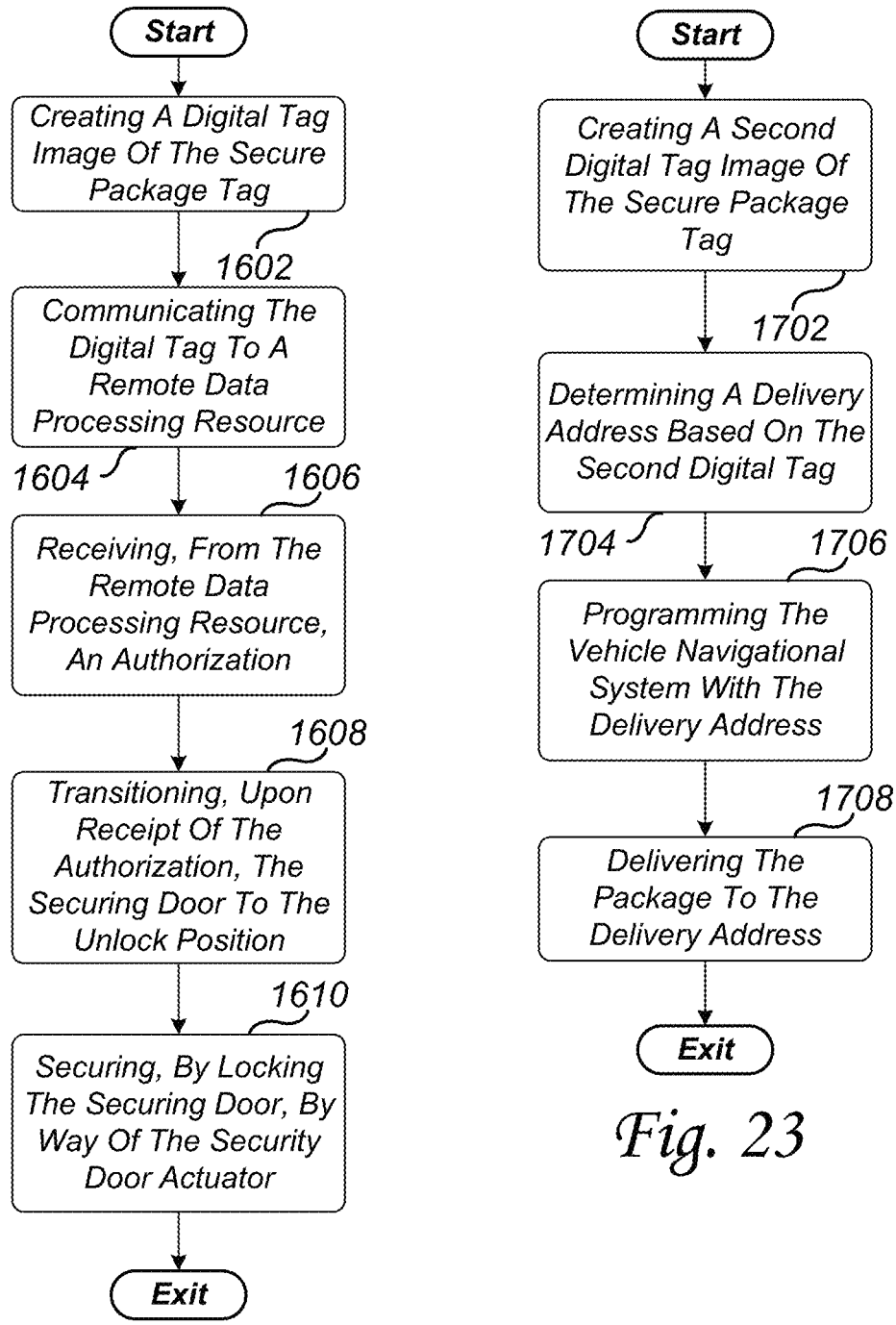

PACKAGE SECURING SYSTEM AND METHOD FOR USE WITH AUTONOMOUS VEHICLES

CROSS-REFERENCE TO RELATED APPLICATIONS

This application contains subject matter which is related to the subject matter of the following co-pending applications. The below-listed application is hereby incorporated herein by reference in its entirety:

This is a U.S. non-provisional application that is a continuation in part of a U.S. non-provisional application Ser. No. 17/003,311, inventor Cary C. Pappas, entitled "PACKAGE SECURING SYSTEM AND METHOD THAT PROTECTS DELIVERED PACKAGES FROM THEFT", filed Aug. 26, 2020;

Which is a continuation in part of a U.S. non-provisional application Ser. No. 16/406,398, inventor Cary C. Pappas, entitled "PACKAGE PROTECTING DOORMAT FRAME HAVING CONCEALED SECURITY TARP", filed May 8, 2019.

TECHNICAL FIELD OF THE INVENTION

This invention relates to a package securing system and method that protects delivered packages from theft by way of a package receptacle that has an access door, a web-enabled control system, and a securing tether that is attached to the access door. Upon receipt of an authorization, the access door transitions to the open position, by way of the securing tether. The open position allows the package to be inserted or removed from the package receptacle. An autonomous vehicle equipped with a vehicle web-enabled control system can make package pickups and deliveries. The autonomous vehicle can be a car, truck, drone, or other autonomous vehicles.

BACKGROUND OF THE INVENTION

Before our invention, with the growth of e-commerce, more and more people are purchasing products online and having them shipped to their destination address of choice. Often these destination addresses are their home where at the time of delivery a recipient might not be present. As such, when a recipient is not home often the delivery company will just leave the package unattended outside the recipient's house.

In a sign of our times, such unattended packages are appealing to thieves. Porch-pirating, as it is often called, is the practice of thieves who steal unattended packages. This problem has reached an epidemic level generating a multi-billion US dollar annual loss to businesses and consumers. 2017 package theft statistics suggested that 31% of us have experienced package theft and that there are 17 reported incidents per 1,000 people in metro areas. Also, the average stolen package value is now $140 and the police make arrests in less than 10% of reported theft cases.

When the package is delivered and then pirated, the recipient may have little recourse. They can try to seek a replacement or refund from the company they bought the product from or they can try to seek a remedy from the delivery company. However absent some kind of fault and if records indicate the package was delivered, the companies involved will often just deny the recipient's claim. Once the claim is denied it can be a total loss for the recipient, no product in hand, and out the money spent on the product and shipping as well.

The present invention addresses this and other shortcomings by providing a way to secure delivered unattended packages from rascal porch-bandits. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a package securing system comprising a package receptacle having an access door, and a web-enabled control system comprising a microcontroller, a camera, a securing tether actuator, and a memory. Each of the camera, the securing tether actuator, and the memory is operationally related to the microcontroller. A securing tether is attached to the access door. The securing tether is operationally related to the securing tether actuator and repositions the access door in an open or a closed position. A package tag comprising a plurality of data that is associated with a package.

The memory is encoded with instructions that when executed by the microcontroller perform the steps of creating, by way of the camera, a digital tag image of the package tag, communicating the digital tag image to a remote data processing resource, receiving, from the remote data processing resource, an authorization, transitioning, upon receipt of the authorization, the access door to the open position, by way of the securing tether, wherein the open position allows the package to be inserted into the package receptacle, and securing, by transitioning the access door to the closed position, by way of the securing tether, after the package is inserted into the package receptacle.

Additional shortcomings of the prior art are overcome and additional advantages are provided through the provision of a package securing system comprising a package receptacle having an access door, and a vehicle web-enabled control system comprising a vehicle microcontroller, a vehicle navigation system, a vehicle communication interface, and a vehicle memory. Each of the vehicle navigation system, the vehicle communication interface, the vehicle memory are operationally related to the vehicle microcontroller. An autonomous vehicle is equipped with the vehicle web-enabled control system, the autonomous vehicle is a car, truck, or drone. A web-enabled control system comprising a microcontroller, a communication interface, a securing tether actuator, and a memory. Each of the communication interface, the securing tether actuator, and the memory is operationally related to the microcontroller. A securing tether is attached to the access door. The securing tether is operationally related to the securing tether actuator and repositions the access door in an open or a closed position.

The memory is encoded with instructions that when executed by the microcontroller performs the steps of communicating an authorization between the communication interface and either the vehicle communication interface or a remote data processing resource, transitioning, upon receipt of the authorization, the access door to the open position, by way of the securing tether, wherein the open position allows the package to be inserted into the package receptacle, and securing, by transitioning the access door to the closed position, by way of the securing tether, after the package is inserted into the package receptacle.

Additional shortcomings of the prior art are overcome and additional advantages are provided through the provision of a package securing system comprising: a package receptacle having an access door, a package has been placed within the package receptacle for pickup. A vehicle web-enabled control system comprising a vehicle microcontroller, a vehicle navigation system, a vehicle communication interface, and a vehicle memory. Each of the vehicle navigation system, the vehicle communication interface, and the vehicle memory is operationally related to the vehicle microcontroller. An autonomous vehicle is equipped with the vehicle web-enabled control system, the autonomous vehicle is a car, truck, or drone. A web-enabled control system comprising a microcontroller, a securing tether actuator, and a memory. Each of the securing tether actuator and the memory are operationally related to the microcontroller. A securing tether is attached to the access door, the securing tether is operationally related to the securing tether actuator and repositions the access door in an open or a closed position.

The memory is encoded with instructions that when executed by the microcontroller performs the steps of communicating an authorization between the communication interface and either the vehicle communication interface or a remote data processing resource, and transitioning, upon receipt of the authorization, the access door to the open position, by way of the securing tether, wherein the open position allows the package to be removed from the package receptacle.

Systems, manufacturing, and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example of a house or business equipped with a package securing doormat frame;

FIG. 3A illustrates one example of a package securing doormat frame with a solid and optionally adjustable back panel installation;

FIG. 3B illustrates one example of a package securing doormat frame with a tether;

FIG. 9 illustrates one example of a package securing doormat frame that is web-enabled;

FIG. 20 illustrates examples of package receptacles with and without the frame with security tarp insert;

FIGS. 22-31 illustrates exemplary embodiments of methods used with a package securing system.

Figure 2:
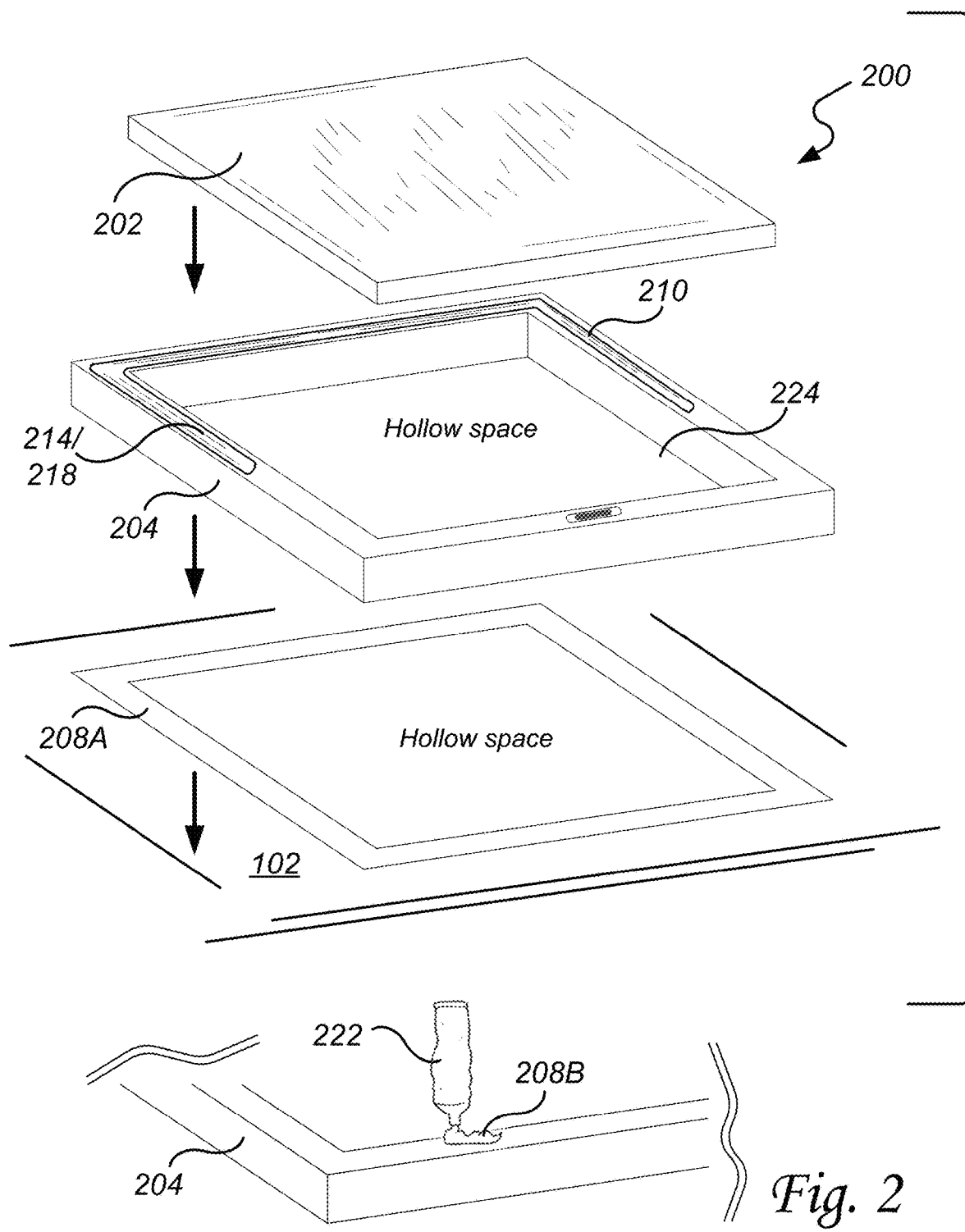
FIG. 2 illustrates one example of a package securing doormat frame installation.

The detailed description explains the preferred embodiments of the invention, together with advantages and features, by way of example with reference to the drawings.

DETAILED DESCRIPTION OF THE INVENTION

Turning now to the drawings in greater detail, it will be seen that in FIG. 1 there is illustrated one example of a house or business 100 equipped with a package securing doormat frame 200. Consumers take pride in how their house looks from the street. In fact, Realtors call this curb appeal. An advantage in the present invention is that while providing delivered unattended package security, the front of the consumer's home or business is not encumbered by unsightly cages or bulky security drop boxes. Rather, the front doormat can be placed in a package securing doormat frame that while bringing a touch of elegance to the front entrance of the home or business also doubles to secure delivered unattended packages.

In this regard, the package securing doormat frame comprises a frame 204 which forms an interior region 224 for receiving at least one of a mat 202, the frame 204 having a recessed chamber 210 along at least a portion of the frame perimeter. A securing rail 218 is operationally related to the frame 204 and repositionable, the securing rail 218 in an open position is located proximate to the recessed chamber 210. A security tarp 214 has at least a portion secured to the frame 204 and at least a portion secured by the security rail 218. The security tarp 214 is stored in the recessed chamber 210. Illustrated better in at least FIG. 6, when at least one of package 302 is placed on the mat 202 packages 302 is secured by repositioning the security rail 218 from the open position to a closed position, the closed position extending the security tarp 214 over the package 302 securing the package between the interior of the security tarp 214 and the interior region 224 of the frame.

Referring to FIG. 2 there is illustrated one example of a package securing doormat frame 200 installation. In an exemplary embodiment, while not excluding plastics, preferably the frame 204 is made of metals such as steel, aluminum, or other metal. A portion of the frame can be a u-channel facing upwards to create the recessed chamber 210 and a portion of the frame can be a square tube. The u-channel and square tube can then be combined and welded to form frame 204.

In another exemplary embodiment, square tubing can be used for frame 204 and the recessed channel 210 can be formed by cutting a portion of the top surface of frame 204. In another exemplary embodiment, the frame can be formed by whatever shape material is desired and a recessed chamber can be welded or otherwise bonded onto the frame.

In a plurality of other exemplary embodiments, the frame can be formed by different methods, plastics, metals, and assembly techniques, as may be required and/or desired in a particular embodiment.

In some neighborhoods or with some consumer 306 preferences it may be acceptable or desirable to simply place frame 204 on ground 102 and position mat 202 in the interior region 224 of the frame 204 to complete the installation.

In other neighborhoods or with other consumers' 306 preferences it might be desirable to place an adhesive 208A in strip or cutout sheet form around the perimeter of frame 204 and adhere the frame 204 to the ground 101. Such adhesive 208A can be a double sticky sided foam tape, COMMAND STRIPS, or other types and kinds of adhesive as may be required and/or desired in a particular embodiment.

In another exemplary embodiment, adhesive 208B can be dispensed from a tube 222 or caulk gun. In this regard, a thick bead of silicone waterproof caulk, LIQUID NAILS adhesive, elastomer caulk such as used with flashing and roof applications, and other types and kinds or caulks, adhesives, and sealants can be used as may be required and desired in a particular embodiment.

Such type of adhesive material and methods of applying can be selected based on the desired strength it would take to remove frame 204 from the ground 102 and/or the potential damage it may cause upon removal to the ground 102 surfaces like brick, stone, concrete, or other types of surface. In this regard, a thick bead of silicon-based caulk might be sufficient to secure frame 204 to the ground 102 to thwart a porch-bandit, as well as prevent rainwater from running under the frame 204 but still enable the consumer 306 to, with reasonable effort, remove the frame 204 from the ground 102 with little to no damage to the ground 102 surface material. Large COMMAND STRIP type adhesives also offer superior bonding and strength but can be removed by the consumer with reasonable effort. Stronger adhesives like LIQUID NAILS and other similar holds stronger but may impact how easily the frame 204 can later be removed from the ground 102 by the consumer 306.

Once frame 204 is positioned and/or adhered to the ground 102 mat 202 can be placed in the interior region 224. Also illustrated is the security rail 218 located proximate to the recessed chamber 210 and the security tarp 214 concealed or otherwise stored in the receded chamber 210.

Referring to FIG. 3A there is illustrated one example of a package securing doormat frame with a solid and optionally adjustable back panel 206 installations. Similar in installation to FIG. 2, in this exemplary embodiment, a back panel 206 is fastened to the bottom or interior sides of frame 204. The back panel 206 can be fabricated from preferably metal however other materials can be selected as may be required and/or desired in a particular embodiment. One of the purposes of the back panel is to create a larger surface area for the adhesive 208. In this regard, the larger surface area enables the use of more adhesive sheeting, foams, COMMAND STRIP, tube 222 based caulks, sealants, or adhesive. The additional adhesive engenders a stronger bond to the ground 102 surfaces.

An advantage, in an exemplary embodiment, and another purpose of the back panel 206 is that the back panel 206 can adjust the distance between the top edge of the frame 204 and the top surface of the back panel 206. In this regard, if the mat 202 is thin in comparison to the thickness of the frame 204 the mat 202 can nest too deep into the frame 204 interior making a user of the mat 202 feel like they are stepping down into the frame 204 to use the mat 202. Also, mat 202 while nested too deep in the frame cannot be easily seen as guests approach the house or business 100. Furthermore, a mat 202 nested too deep in frame 204 can create a tripping hazard as users of the mat 202 are having to step down into and out of frame 204 to enter or leave the house or business 100. To remedy this, the back panel 206 sets the depth distance effectively raising mat 202 so that the top of the mat 202 is aligned with the top of frame 204. In operation, the back panel 206 can be manufactured so that a consumer 306 can adjust the depth of the back panel to accommodate the thickness of their mat 202, effectively customizing the alignment of the top of their mat 202 with the top of the frame 204.

Another advantage in the present invention of the back panel 206 is that it seals the bottom of frame 204 from the ground and ingress debris, surface water, ants, and bugs. This is important if consumer 306 is planning on receiving packages of food or other packages where it is preferable they do not get dirty, wet, or infested with ants, and bugs.

Once frame 204 is positioned and/or adhered to the ground 102 mat 202 can be placed in the interior region 224 of frame 204. Also illustrated is security rail 218 located proximate to the recessed chamber 210 and the security tarp 214 concealed within the recessed chamber 210.

Referring to FIG. 3B, there is illustrated one example of a package securing doormat frame with a tether 228. In an exemplary embodiment, a tether 228 has a first end attached to frame 204 and a second end 230 that is securable behind a closed-door 104 or window. In operation, the tether 228 effectuates the ability to secure the frame 204 which is securing, and the package contents 302 secured by the frame 204 from being removed or otherwise stolen from the porch by porch bandits. To secure the frame 204 and package contents 302 to the porch the tether 228 can be pulled under an open door 104 or window and the door 104 or window closed. A knot, ball, or other form, shape, or object 230 that make up the second end portion 230 prevents the second end 230 from being extracted or otherwise pulled from under a closed-door 104 or window thus securing the frame 204 and the secured package contents from being removed from the porch.

When desired, frame 204 can be removed from the porch by sliding the tether 228 from under an open door 104 or window.

Figure 4:
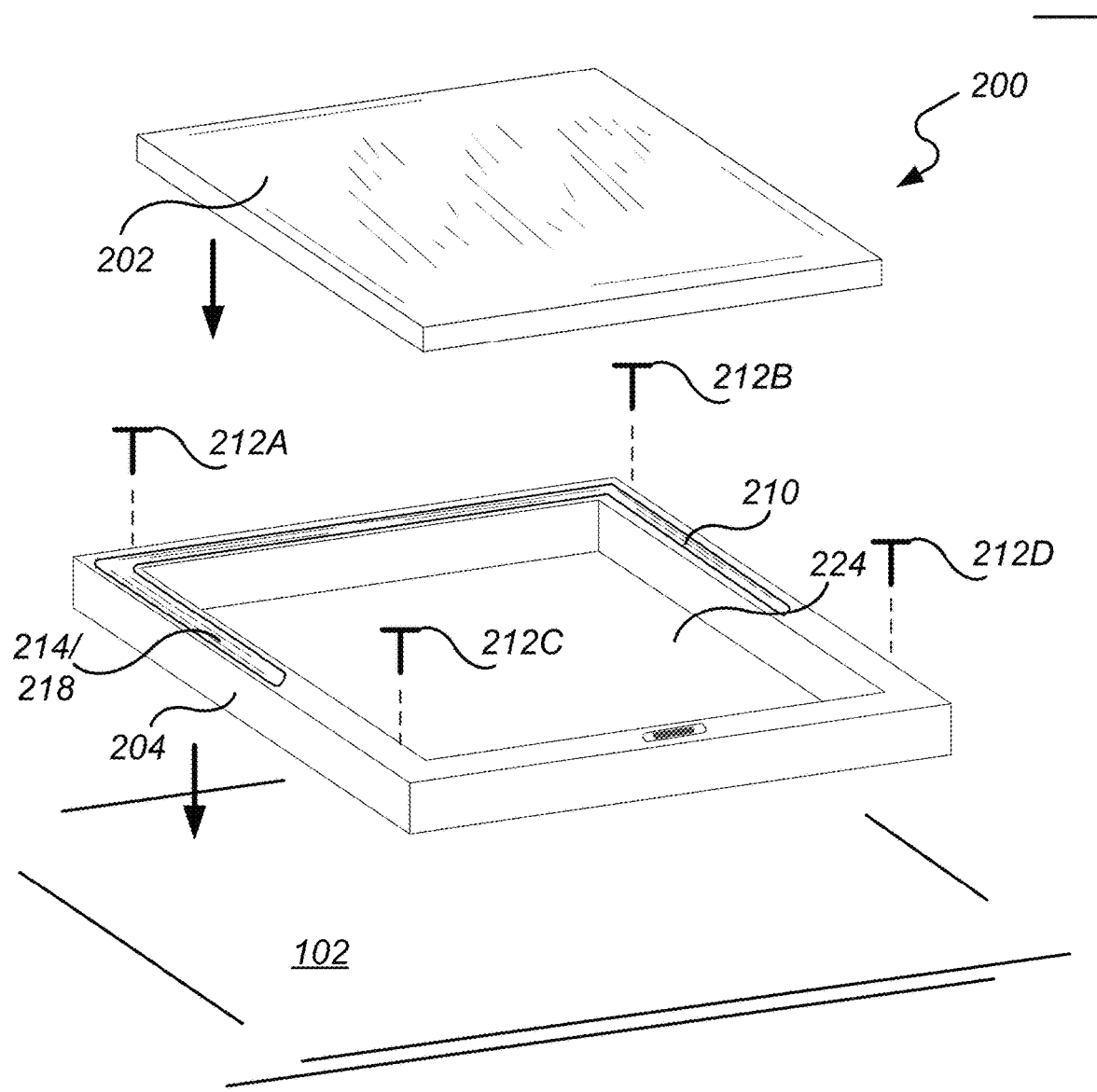
FIG. 4 illustrates one example of a package securing doormat frame installation utilizing anchor bolts.

Referring to FIG. 4 there is illustrated one example of a package securing doormat frame 204 installation utilizing anchor bolts 212A-212D. In another exemplary embodiment, if the installation methods and techniques of FIG. 2 and FIG. 3A, with the use of caulks or adhesives, are inadequate to secure frame 204 to the ground 102 then anchor bolts 212A-212D can fasten frame 204 to the ground 102.

Once frame 204 is positioned, fastened, and/or adhered to the ground 102 mat 202 can be placed in the interior region 224 of frame 204. Also illustrated is the security rail 218 located proximate to the recessed chamber and the security tarp 214 concealed or otherwise stored within the recessed chamber 210.

Figure 5:
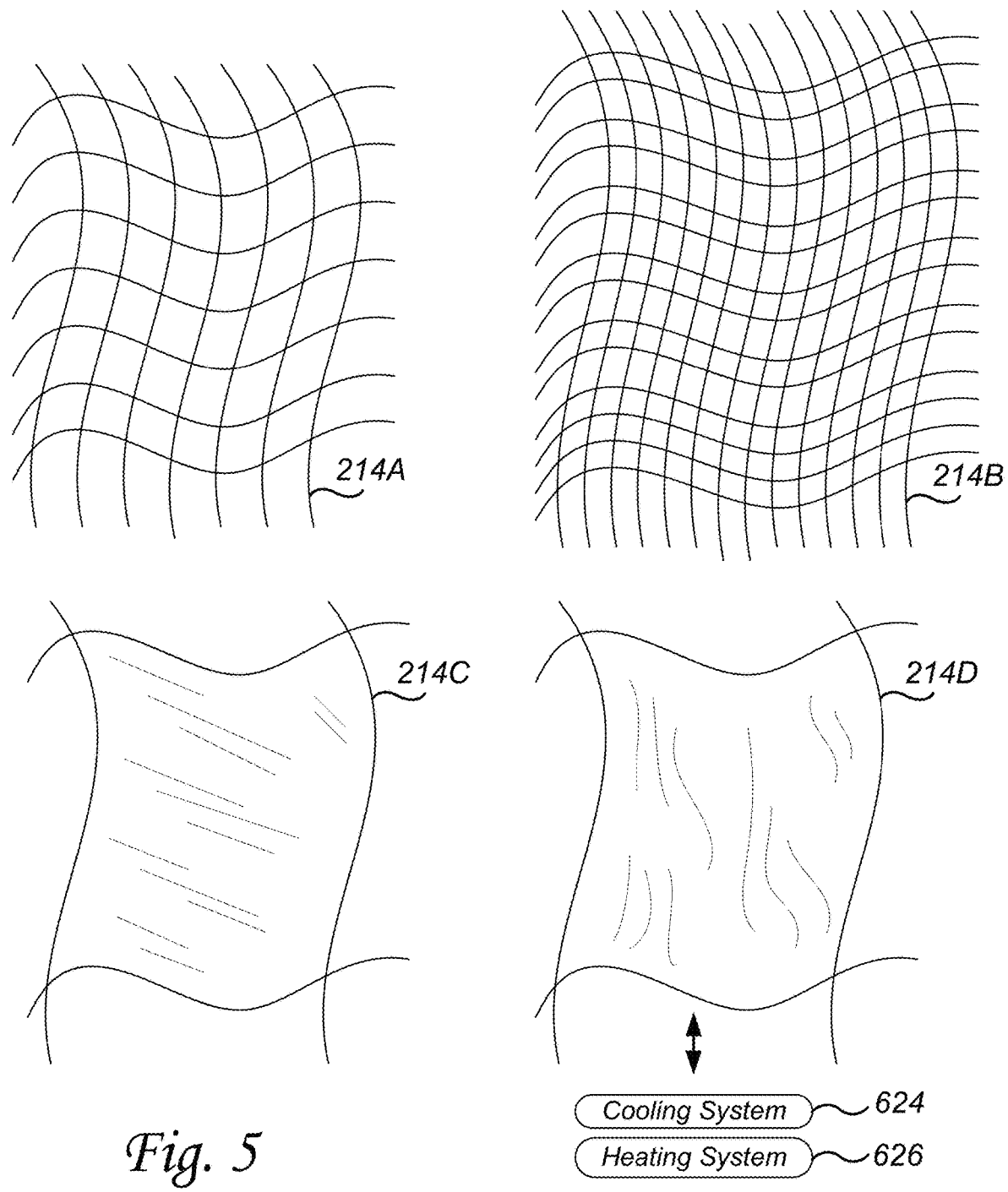
FIG. 5 illustrates examples of a security tarp.

Referring to FIG. 5 there are illustrated examples of a security tarp 214. In an exemplary embodiment, a security tarp 214 is cut and tear-resistant and well suited to prevent a porch-bandit from removing a package from the mat with the package securing doormat frame 200 is in the closed position where the security tarp 214 is extended over the package 302 thus securing the package 302 between the interior of the security tarp and the interior region 224 of the frame 204. To this end, there are several materials and combinations of materials that are well suited to be used as a security tarp 214. Such a list is provided as an example and not as a limitation.

Such security tarp 214 material is preferably cut, tear, and break-resistant netting 214A. The spacing of the net fiber web can be wide as in 214A or closer together like in 214B. The fibers can be nylon, KEVLAR rope, metal wire, wire rope, rope, chain, or other material as may be required and/or desired in a particular embodiment.

Such fibers can from an open net where package 302 can be seen with the net extended over package 302 or can be combined into a sheet 214C such as plastic, KEVLAR sheeting, canvas, or other material which blocks package 302 from sight. In addition, when such a reinforced sheet covers package 302 it can be secured as well as be weather-resistant to snow and rain when such is the desired feature.

Additionally, such a sheet can be a thermal blanket 214D. In this regard, the package securing doormat frame 200 can incorporate a heating 626 or cooling 624 system. Such a system is better illustrated in at least FIG. 9. Such a thermal blanket 214D can be reinforced with other sheets 214C as well as netting 214A or 214B for security. The thermal blanket 214D is desirable when the package securing doormat frame 200 is used to receive hot food or prevent freezing in cold weather and/or packages that require refrigeration such as medical supplies and/or prescriptions or prevent packages from overheating in hot weather.

The thermal blanket not only aids in temperature control of the secured interior region 224 between the interior of the security tarp 214 and the mat 202 but can also be useful to abate heated direct sunlight. In this regard, when the package securing doormat frame 200 is a place where delivered packages are in direct sunlight overheating of the package contents could occur. In this situation, the thermal blanket security tarp is extended across the packages to help shield the packages from a portion of the sun-induced heat.

Figure 6:
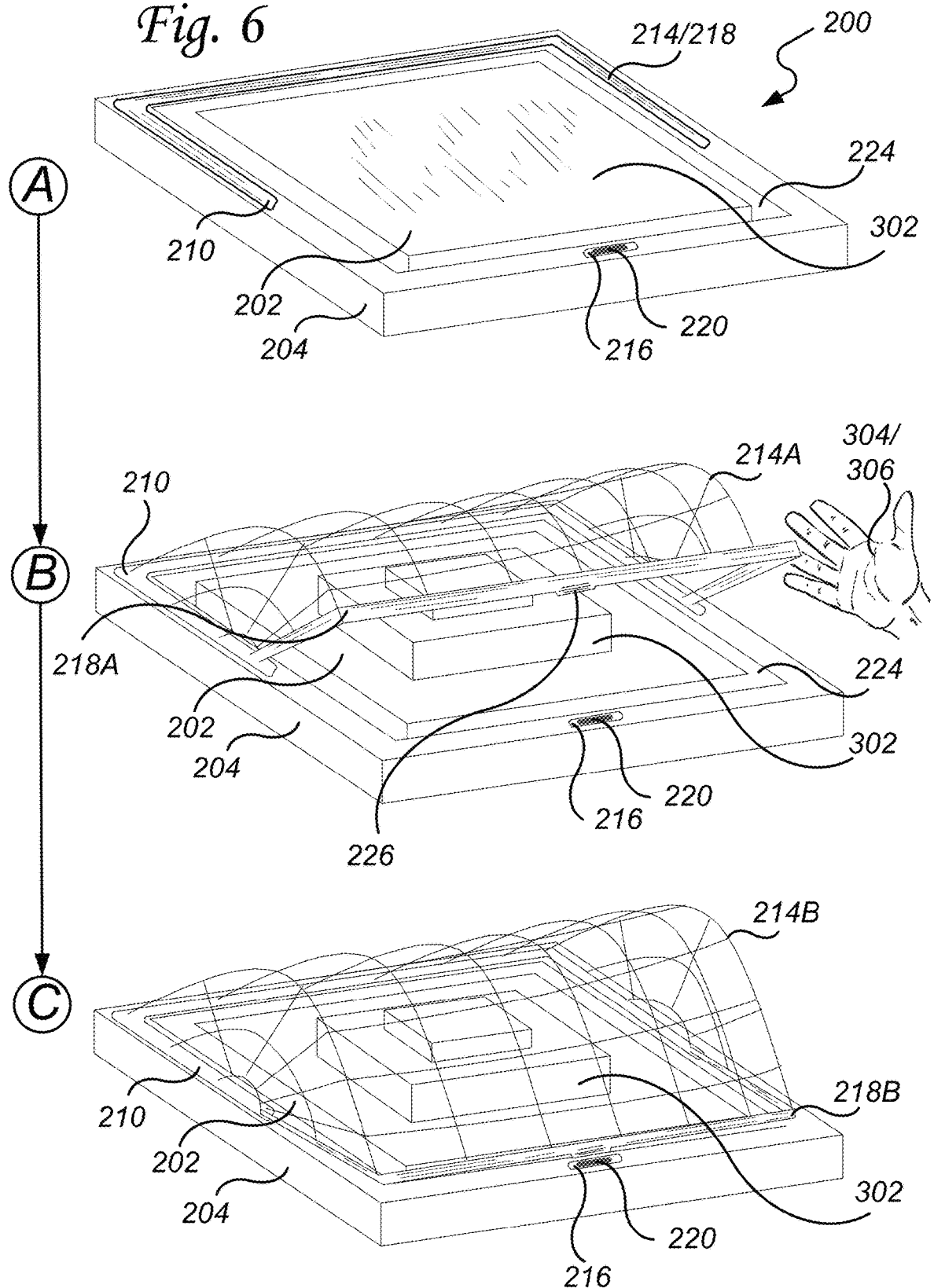
FIG. 6 illustrates one example of a package securing doormat frame transitioning from the open position to the closed position.

Referring to FIG. 6 there is illustrated one example of a package securing doormat frame 200 transitioning from the open position to the closed position. Three positions are illustrated. Position 'A' is the open position, position 'B' is the transition position, and position 'C' is the closed position.

Starting with the open position 'A', in an exemplary embodiment a package securing doormat frame 200 is placed at a package receiving location 100 such as a home or business. The package securing doormat frame 200 comprises a frame 204, a security rail 218, and a security tarp 214.

The frame 204 forms an interior region 224 within the perimeter of the frame 204 for receiving at least one of a mat 202. Frame 204 has a recessed chamber 210 along at least a portion of the frame 204 perimeter. The securing rail 218 is operationally related to frame 204 and repositionable. The security rail 218 is located proximate to the recessed chamber 210 and the security tarp 214 is concealed within the recessed chamber 210. The securing rail 218 is in an open position.

In an exemplary embodiment, the securing rail 218 can be shaped and fitted to seal or otherwise cover the recessed chamber 210 from ingress of debris and water when the security rail 218 is in the open position.

In position 'B', a package delivery person 304 has placed at least one package 302 on mat 202. The security rail 218 can then be transitioned by hand 304 or if a web-enabled control system is in use automatically transitioned from the open position towards the closed position causing the security tarp 214 which is attached to the security rail 218 to emerge from storage in the recessed chamber and extend across the package 302.

In position 'C' the package is secured by repositioning the security rail 218 from the open position to a closed position which extended the security tarp 214 over package 302 entrapping the package 302 between the interior of the security tarp 214 and the interior region 224 of the frame 203. The security tarp 214 has at least a portion secured to the frame 204 and at least a portion secured by the security rail 218.

In an exemplary embodiment, the security rail 218 comprises a security edge 226 and the frame 204 further comprising a security latch 216. The security edge 226 and security latch 216 interlocks holding the security rail 218 in the closed position.

A security rail locking mechanism 220 is integrated into frame 204, the security rail locking mechanism 220 effectuates the ability to lock and unlock the security rail 218 from the closed position.

In an exemplary embodiment, in the closed position the security rail 218 is latched or otherwise locked into position by way of the security rail locking mechanism 220. Once latched it will require a key, code, electronic signal data communicated to a web-enabled package securing doormat frame 200, or similar to unlatch or otherwise unlock the security rail 218 so that the package 302 can be retrieved.

In this regard, upon arriving to retrieve package 302, consumer 306 unlocks the security rail 218 manually and by hand return the security rail 218 and security tarp 214 to the open position 'A', re-storing the security tarp 214 in the recessed chamber 210.

If a web-controlled control system 600 is in use returning to position 'A' can be automatic and/or effectuated by way of authorization being data communicated to the package securing doormat frame 200 with instructions to return to the open position. A security tarp/securing tether actuator 630, better illustrated in at least FIG. 9, can be used to transition the security rail 218 between the open position and the closed position.

The term "web-enabled" or "web-enabled control system" or "web-enabled control system 600" in the present invention is intended to mean an Internet-of-things device. In this regard, a device that is capable of connecting a physical device such as the package securing doormat frame 200 to the digital world. State differently, web-enabling is equipping a device with the necessary electronics to be monitored, controlled, and data communicate locally and remotely with other data communicating devices. Such other data communicating devices can be smartphones, tablets, laptops, other web-enabled devices, servers, cameras, and similar devices. For purposes of disclosure and with reference to at least FIG. 9, these other data communicating devices can be referred to as data device 506. The web-enabled camera 402 can be referred to as web-enabled and a data device.

In addition, such data devices 506 can data communicate with remote data processing resources 504 and utilize data storage resources 502. Such data processing resources can be a server or other types and kinds of data processing resources. Furthermore, data devices 506, remote data processing resources 504, data storage resources 502, and other types and kinds of data communicating devices can data communicate over a global network 500. The global network 500 can be the Internet.

Figure 7:
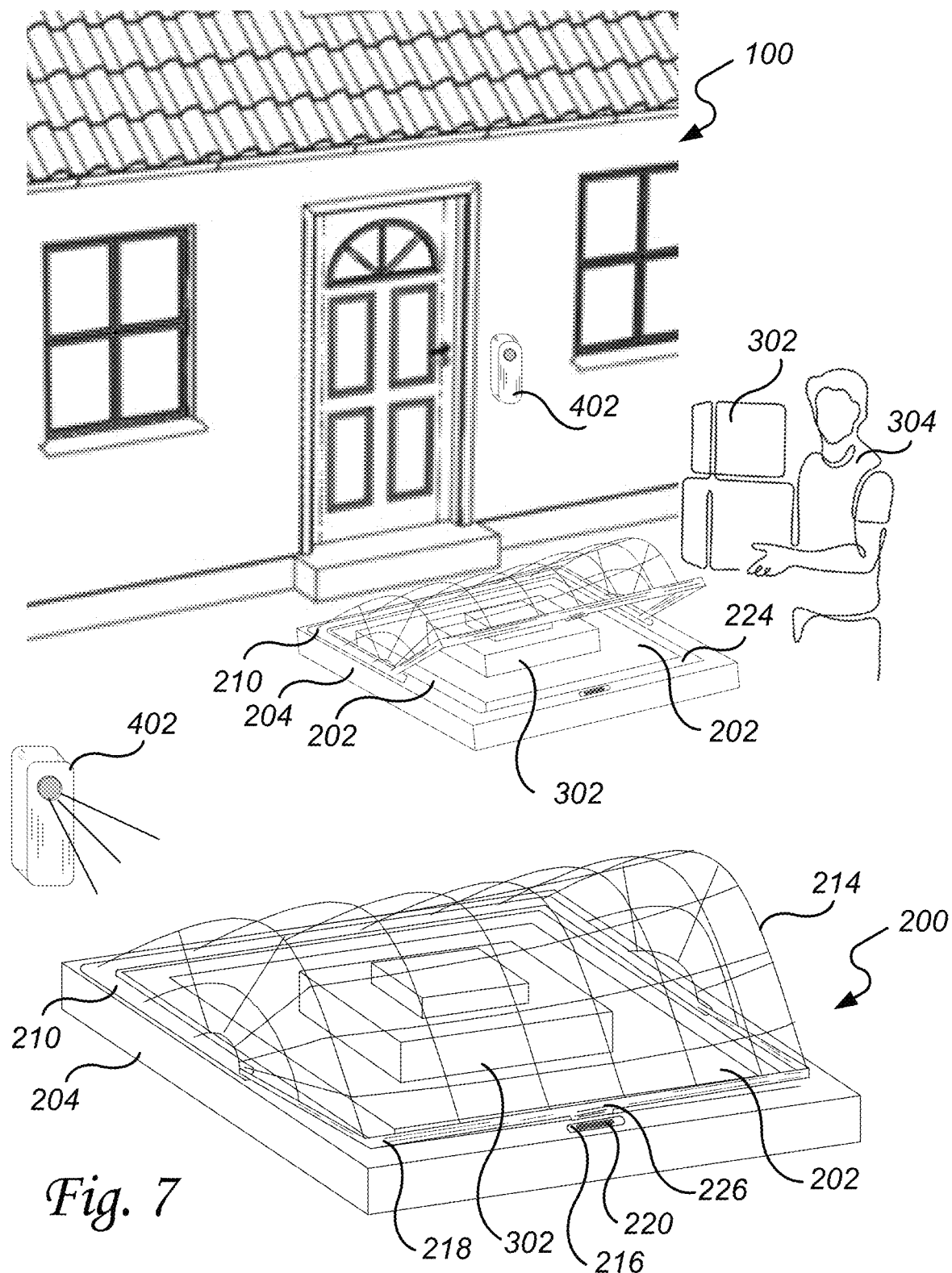
FIG. 7 illustrates one example of a package delivery person placing packages on a mat, the packages are then secured by a package securing doormat frame.

Referring to FIG. 7 there is illustrated one example of a package delivery person 304 placing packages 302 on a mat 202, the packages 302 are then secured by a package securing doormat frame 200. In an exemplary embodiment, the package securing doormat frame 200 is placed at the front door of a house or business 100 or other convenient package receiving location.

When a package delivery person 304 arrives at location 100 with packages 302 they can quickly place them on the mat 202 and transition the security rail 218 from the open position to the closed position. In the closed position, the security rail 218 is latched or otherwise locked into position by way of security rail locking mechanism 220. Once latched it will require a key, code, electronic signal data communicated to a web-enabled package securing doormat frame 200, or similar to unlatch or otherwise unlock the security rail 218 so that the package 302 can be retrieved.

The security rail 218 comprises a security edge 226 and the frame 204 further comprising a security latch 216. The security edge 226 and security latch 216 interlocks holding the security rail 218 in the closed position.

In an exemplary embodiment, the security rail locking mechanism 220 is integrated into the frame 204, the security rail 218 release locking mechanism 220 effectuates the ability to lock and unlock the security rail 218 from the closed position.

In another exemplary embodiment, a web-enabled camera 402 can be positioned to observe the package securing doormat frame 200. In this regard, by way of a camera 402 an optical motion-free zone around the package securing doormat frame 200 can be established. Such an optical free zone occurs when a camera successfully compares images of the same view to determine if a change has occurred and if so has a preset motion threshold has been reached. Such a camera 402 can be a RING device, surveillance camera, or other camera. Camera 402 can also be combined with PIR sensors to detect motion.

When motion is detected, by way of the camera 402, within the motion-free zone, an alarm condition is initiated. Such alarm conditions can include recording video, by way of the camera 402, sending a secure package notification to a predetermined recipient, activating an alarm bell or voice, or initiating other alarms as may be required and/or desired in a particular embodiment.

Figure 8A:
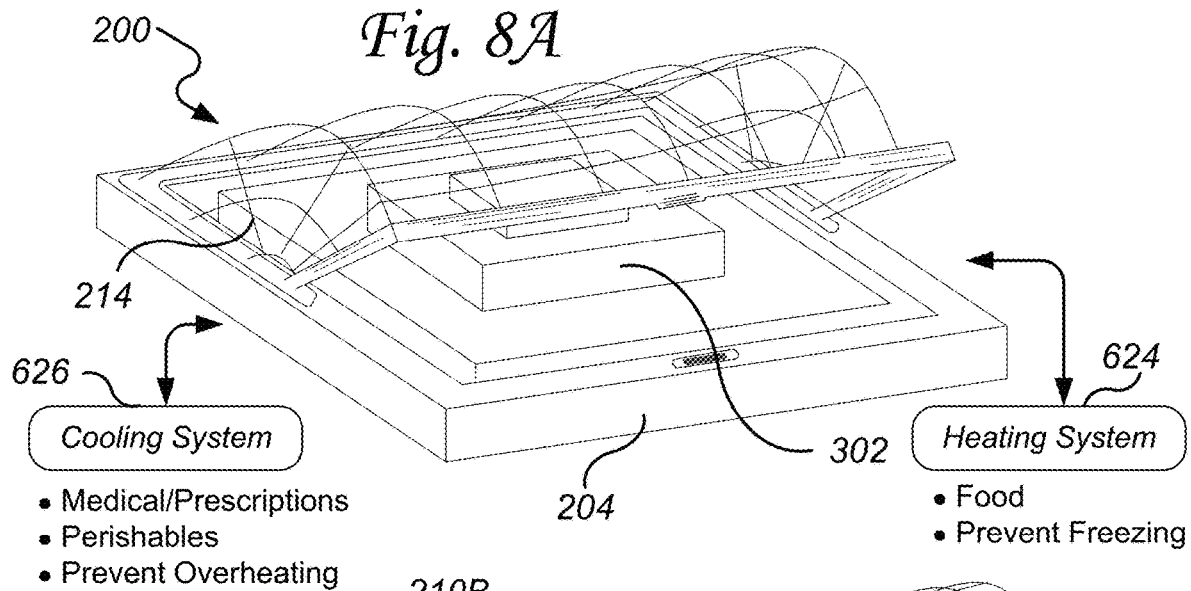
FIGS. 8A, 8B, and 8C illustrate exemplary embodiments of a package securing doormat frame.
Figure 8B:
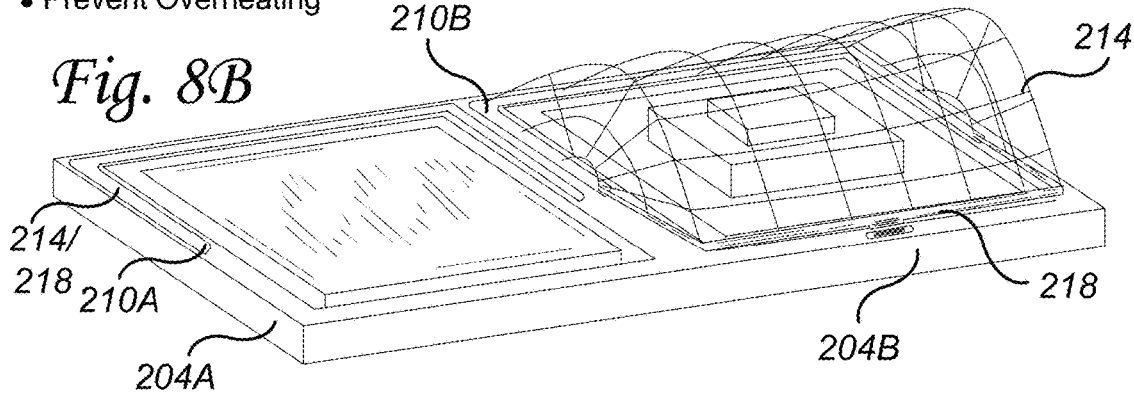
Figure 8C:
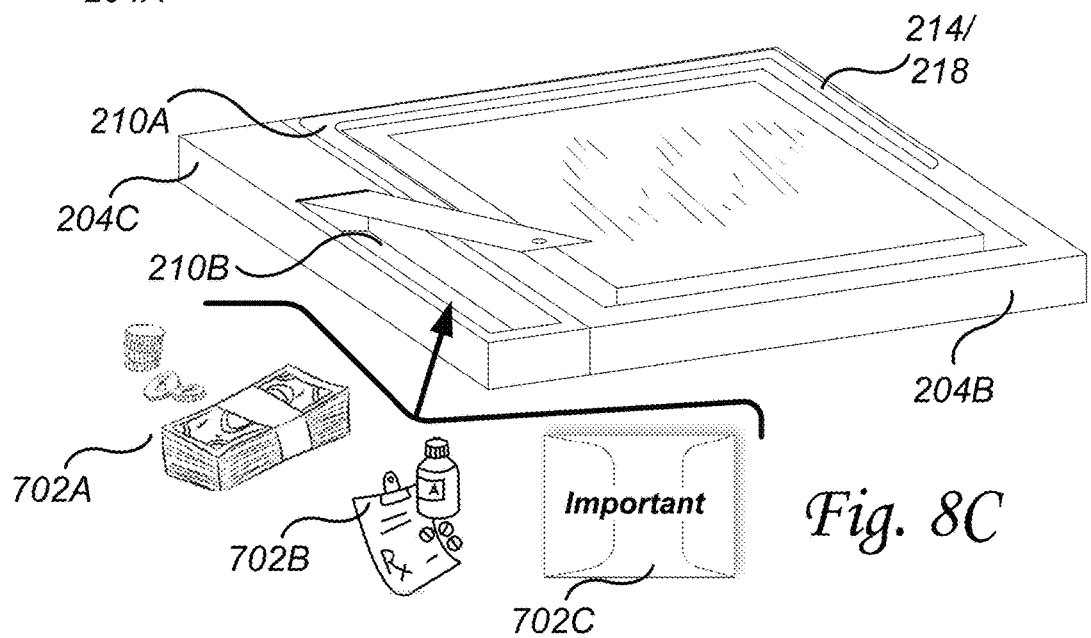

Referring to FIGS. 8A, 8B, and 8C there are illustrated exemplary embodiments of a package securing doormat frame 200. With reference to FIG. 8A, there is illustrated an exemplary embodiment of a package securing doormat frame 200 that has been equipped with a heating system 624 and/or a cooling system 626. In this regard, in combination with a security tarp 214 packages such as food, medical prescriptions, perishables, and other packages 302 types that benefit from being kept warm or cold can be accommodated. The heating system 624 and/or the cooling system 626 can be integrated into frame 204 to keep package 302 warm or cold, as may be required and/or desired in a particular embodiment.

An advantage in the present invention is that the heating 624 and cooling 626 systems can be used in combination with a thermal blanket material security tarp 214 to enable warming of package 302 to prevent freezing in cold weather and/or cooling of package 302 to prevent overheating in hot weather.

With reference to FIG. 8B, there is illustrated an exemplary embodiment of interconnecting more than one package securing doormat frames 204A and 204B together. In this regard, each can operate independently to accommodate additional packages. An advantage can be that if more than one package delivery person delivers packages each delivery can be secured without having to open a previously secured package securing doormat frame. This also offers an attractive option for homes or businesses 100 that have double doors and would ideally have a mat associated with each door.

In an alternative exemplary embodiment, a single security tarp 214 can be configured to cover more than one frame 204A and 204B. In this regard, more packages 302 and/or larger size packages 302 can be accommodated with a single security tarp 214 spanning multiple co-joined interior regions 224. In a plurality of exemplary embodiments, a combination of single security tarp 214 secures single frame 204 and a mix of single security tarp 214 secures multiple interior regions 224 of frames 204 interlocked together can be configured to meet package delivery person 304 and/or consumer 306 needs, as may be required and/or desired in a particular embodiment.

Referring to FIG. 8C there is illustrated an exemplary embodiment that interconnects a package securing doormat frame 204B with one or more package securing doormat frame lockbox 204C. The lockbox 204C made of metal or other desirable materials is designed to receive valuables such as money 702A, medical prescriptions 702B, important papers 702C, and other types and kinds of packages that are small and/or require lockbox types security. The lockbox 204C can be opened and closed by key, code, electronic signal data communicated to a web-enabled package securing doormat frame 200, or other methods as may be required and/or desired in a particular embodiment.

An advantage in the present invention is that the exemplary embodiments can be mixed and matched to configure the package securing doormat frames, lockboxes, and other capabilities as required and/or desired in a particular embodiment. As an example and not a limitation, three package securing doormat frames can be interlocked together or a lockbox can be fashioned between two package securing doormat frames. In other embodiments, two package securing doormat frames can be interlocked together and one of the package securing doormat frames can be configured to heat and the other equipped to cool. In a plurality of exemplary embodiments, the flexibility of the present invention to mix package securing doormat frames, lockboxes, and other functional units allows the consumer 306 to configure a fit-for-purpose package securing system to meet their individual needs.

Referring to FIG. 9 there is illustrated one example of a package securing doormat frame 200 that is web-enabled. The term "web-enabled" or "web-enabled control system", "web-enabled control system 600", "vehicle web-enabled control system", or "web-enabled control system 800" in the present invention is intended to mean an Internet-of-things device. In this regard, a device that is capable of connecting a physical device such as the package securing doormat frame 200 to the digital world. State differently, web-enabling is equipping a device with the necessary electronics to be monitored, controlled, and data communicate locally and remotely with other data communicating devices. Such other data communicating devices can be smartphones, tablets, laptops, other web-enabled devices, servers, and similar devices.

In addition, such data devices 506 can data communicate with remote data processing resources 504 and utilize data storage resources 502. Such data processing resources can be a server or other types and kinds of data processing resources. Furthermore, data devices 506, remote data processing resources 504, data storage resources 502, and other types and kinds of data communicating devices can data communicate over a global network 500. The global network 500 can be the Internet.

In an exemplary embodiment, the package securing doormat frame 200 can be equipped with a web-enabled control system 600. Such a web-enabled control system can comprise a microcontroller 602 which is operationally related to a plurality of communication interfaces 604, a power supply 606, a security tarp/securing tether controller 608, a display 610, general-purpose inputs and outputs (GPIO) interface 612, a memory 614, a camera interface 616, a plurality of sensors 618, an alarm 620, ambient condition sensors 622, a heating system 624, a cooling system 626, and global position system device 628. The security tarp/securing tether controller 608 can be interconnected with a security tarp/securing tether actuator 630.

The microcontroller 602 can be INTEL, ZILOG, MICROCHIP, AMD, ARM, and/or other types or kinds of microcontrollers.

The communication interfaces 604 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The power supply 606 can be AC, DC, battery, solar, and/or other types and kinds of power supplies.

The security tarp/securing tether controller 608 can be a relay, MOSFET, or other types and kinds of controlling devices. The security tarp/securing tether actuator 630 is operationally related to the security tarp/securing tether controller 608 and can be a motor, solenoid, and/or other types and kinds of actuators. In operation, the security tarp/securing tether actuator 630 can be interconnected with a tether 906 which is fastened to a package receptacle 902 door 904. The securing tether 906 is configured to mechanically open and close door 904 with the activation and deactivation of the security tarp/securing tether actuator 630 by way of the security tarp/securing tether controller 608. The securing tether 906 can be a mechanical linkage, cable and pulley, or other types and kinds of tether systems for opening and closing the door 904 as may be required and/or desired in a particular embodiment.

The display 610 can be an LCD, OLED, LED, and/or other types and kinds of display.

The GPIO 612 can be TTL, CMOS, transistors, buffers, relays, pushbutton, switch, and/or other types and of types and kinds of GPIO circuits.

The memory 614 can be combinations of RAM, ROM, flash, hard drives, solid-state drives, USB flash drives, and/or other types and kinds of memory.

The camera interface 616 can be integrated into frame 204 or can be remote such as illustrated by camera 402 so that the camera view is of the package securing doormat frame 200 and surrounding area. Also, several cameras can be utilized to create a network of camera views that can monitor a broader area. Such multiple camera applications can include some that are integrated into the frame 204 and some that are remote. Web-enabled camera 402 can interface and data communicate as one of the camera interface 616.

The sensors 618 can be PIR motion sensors, infrared, thermal, Doppler radar, ultrasonic, capacitance, touch-type, optical, Hall effect, switch, fingerprint, and other types of biometric sensors, and/or other types and kinds of sensors.

The alarm 620 can be noise lights, relays, siren, horn, piezo buzzer, speaker, voice annunciations, and/or other types and kinds of alarms.

The ambient condition sensors 622 can be temperature, moisture, humidity, sunlight, time, date, and/or other types and kinds of sensors.

The heating system 624 can be resistive heat with fan circulation, thermoelectric, and/or other types and kinds of heating systems.

The cooling system 626 can be a Peltier thermoelectric system and/or other types and kinds of cooling systems.

The global position system (GPS) device 628 can be used to determine the geographic location of the package securing doormat frame.

In operation, in an exemplary embodiment, the package securing doormat frame 200 can be equipped with a web-enabled control system 600 so that the package securing doormat frame 200 can be remotely monitored and controlled. Such remote monitoring and control can be effectuated by the package delivery person 304, the consumer 306, a remote service provider 308, and/or others as may be required and/or desired in a particular embodiment. Such remote service provider 308 can be PorchBanditProtection.com, an alarm monitoring company, a package delivery company, or other types and kinds of remote service providers.

In addition, such remote monitoring control can be by way of digit device 506 or remote data processing resource 504. Furthermore, package securing doormat frame 200 can be operated manually, by hand, illustrated as the package delivery person 304A and the consumer 306A and/or through a control panel 508, when so configured, illustrated as the package delivery person 304B or the consumer 306B.

In an exemplary embodiment, the security rail 218 comprises a security edge 226 and the frame 204 further comprising a security latch 216. The security edge 226 and security latch 216 interlocks holding the security rail 218 in the closed position.

A security rail locking mechanism 220 is integrated into frame 204, the security rail locking mechanism 220 effectuates the ability to lock and unlock the security rail 218 from the closed position. Such security rail locking mechanism 220 in a web-enabled control system 600 applications can be actuated locally or remotely controlled.

In the closed position, the security rail 218 is latched or otherwise locked into position by way of security rail locking mechanism 220. Once latched it will require a key, code, electronic signal data communicated to a web-enabled package securing doormat frame 200, or similar to unlatch the security rail 218 so that the package 302 can be retrieved.

Figure 10:
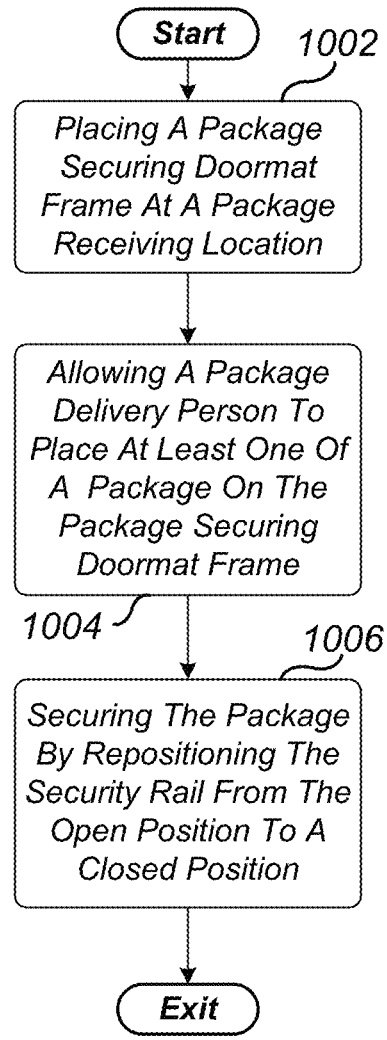
FIGS. 10 and 11 illustrate examples of a method of protecting packages by way of a package securing doormat frame having a concealed security tarp.

Referring to FIG. 10 there is illustrated one example of a method of protecting packages by way of a package securing doormat frame having a concealed security tarp. In an exemplary embodiment, the method begins in block 1002.

In block 1002 a package securing doormat frame 200 is placed at a package receiving location such as a house or business 100. The package securing doormat frame 200 comprises a frame 204, a security rail 218, and a security tarp 214. The frame 204 forms an interior region 224 for receiving at least one of a mat 202. Frame 204 has a recessed chamber 210 along at least a portion of the frame 204 perimeter. The securing rail 218 is operationally related to frame 204 and repositionable. The securing rail 218 in an open position is located proximate to the recessed chamber 210, as illustrated in at least position 'A' of FIG. 6. The method moves to block 1004.

In block 1004, a package delivery person 304 is allowed to place at least one of a package 302 on mat 202. The method moves to block 1006.

In block 1006, package 302 is secured by repositioning the security rail 218 from the open position to a closed position which extends the security tarp 214 over package 302 entrapping package 302 between the interior of the security tarp 214 and the interior region 224 of the frame 204. The closed position is illustrated in at least position 'C' of FIG. 6. The security tarp 214 has at least a portion secured to the frame 204 and at least a portion secured by the security rail 218. The method is then exited.

Figure 11:
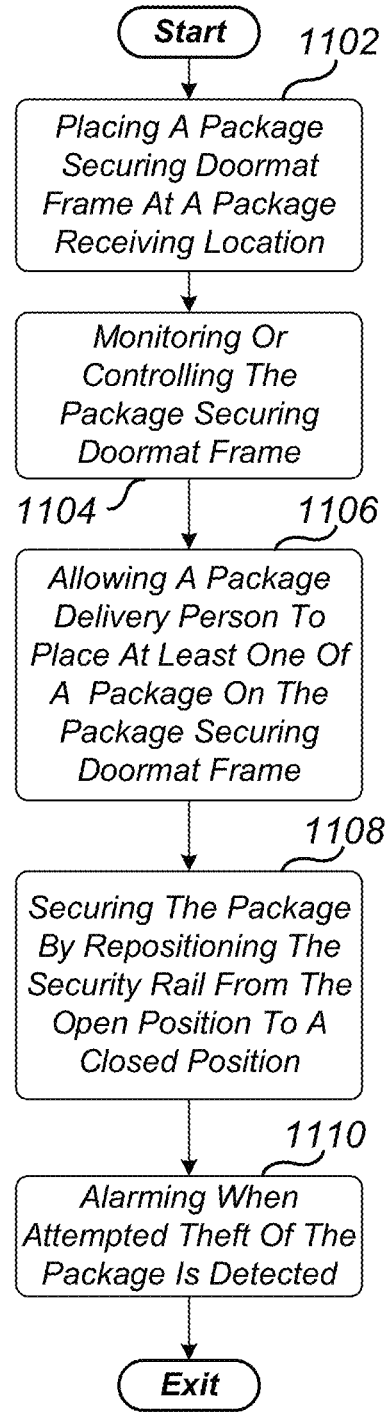

Referring to FIG. 11 there is illustrated one example of a method of protecting packages by way of a package securing doormat frame having a concealed security tarp. In an exemplary embodiment, the method begins in block 1102.

In block 1102 a package securing doormat frame 200 is placed at a package receiving location such as a house or business 100. The package securing doormat frame 200 comprises a frame 204, a security rail 218, and a security tarp 214. The frame 204 forms an interior region 224 for receiving at least one of a mat 202. Frame 204 has a recessed chamber 210 along at least a portion of the frame 204 perimeter. The securing rail 218 is operationally related to frame 204 and repositionable. The securing rail 218 in an open position is located proximate to the recessed chamber 210, as illustrated in at least position 'A' of FIG. 6. The method moves to block 1104.

In block 1104, the package securing doormat frame 200 is monitored and/or controlled by way of a web-enabled control system 600. The method moves to block 1106.

In block 1106, a package delivery person 304 is allowed to place at least one of a package 302 on mat 202. The method moves to block 1108.

In block 1108, package 302 is secured by repositioning the security rail 218 from the open position to a closed position which extends the security tarp 214 over package 302 entrapping package 302 between the interior of the security tarp 214 and the interior region 224. The closed position is illustrated in at least position 'C' of FIG. 6. The security tarp 214 has at least a portion secured to the frame 204 and at least a portion secured by the security rail 218. The method moves to block 1110.

In block 1110 an alarm is initiated when an attempted theft of package 302 is detected. The method is then exited.

Figure 12:
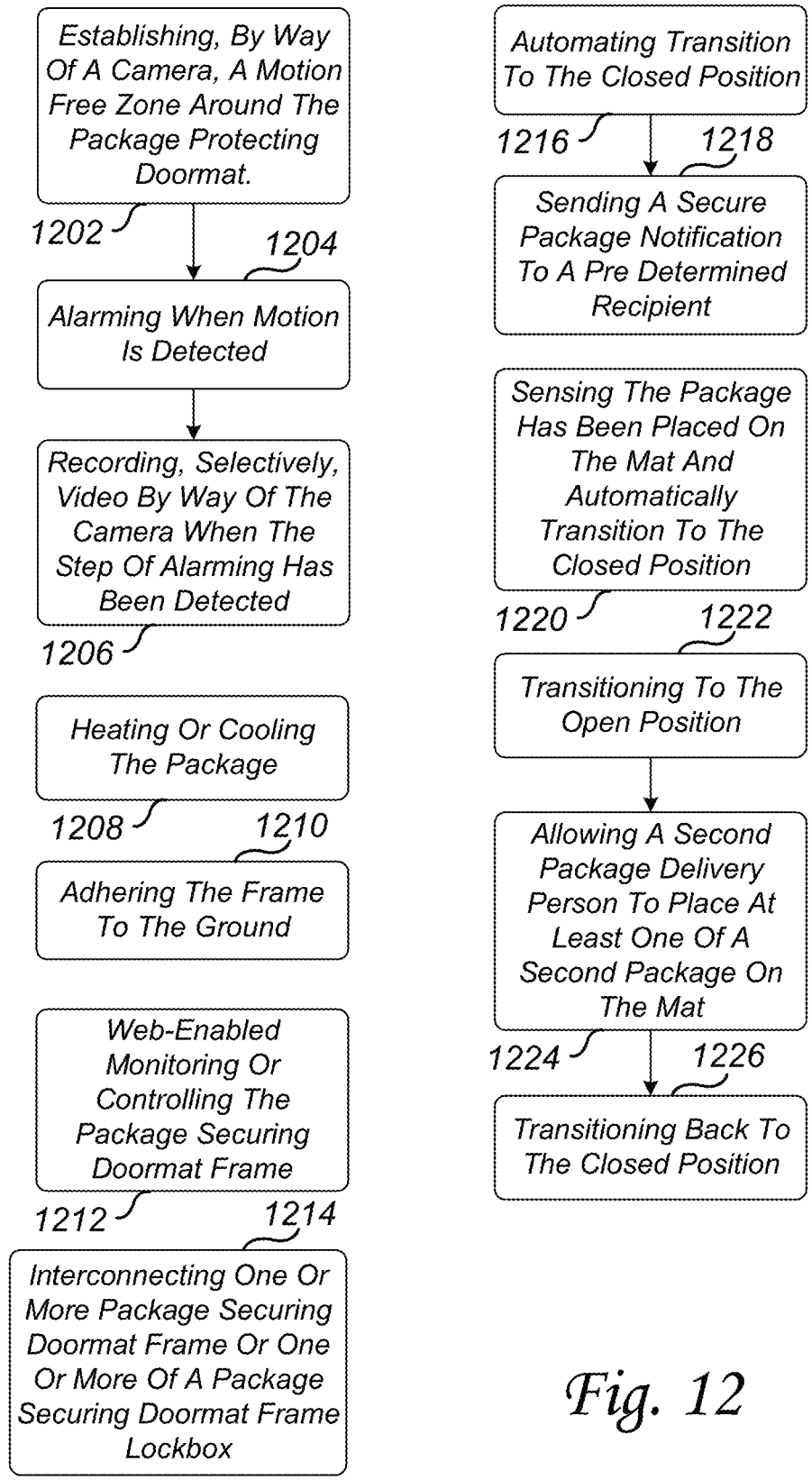
FIG. 12 illustrates exemplary embodiments of a method of protecting packages by way of a package securing doormat frame having a concealed security tarp.

Referring to FIG. 12 there are illustrated exemplary embodiments of a method of protecting packages by way of a package securing doormat frame having a concealed security tarp.

In block 1202 by way of a camera, an optical motion-free zone is established around the package securing doormat frame. The method moves to block 1204.

In block 1204, when motion is detected, by way of the camera, within the motion-free zone an alarm is initiated. The method moves to block 1206.

In block 1206, selectively, video is recorded by way of the camera when the step of alarming has been detected.

In block 1208, package 302 is heated and/or cooled by way of a heating system 624 or a cooling system 626.

In block 1210, frame 204 can be adhered to ground 102 to prevent frame 204 from easily being moved.

In block 1212, the package securing doormat frame 200 can be monitored and/or controlled by way of a web-enabled control system 600.

In block 1214, with reference to at least FIGS. 8A, 8B, and 8C, one or more of a second package securing doormat frame 200A and 200B or one or more of a package securing doormat frame lockbox 204C can be interconnected.

In block 1216, the security tarp 214 transitions to the closed position can be automated, by way of, using a plurality of sensors 618 to detect the package has been placed on the mat. The method moves to block 1218.

In block 1218, a secure package notification can be sent to a predetermined recipient, by way of, the web-enabled control system 600.

In block 1220, package 302 having been placed on mat 202 can be sensed and the security tarp 214 automatically transitions to the closed position.

In block 1222, the security tarp 214 can be transitioned to the open position, upon receipt of authorization. Such authorization can be sent or otherwise provided by a package delivery person 304 or a courier company, the consumer 306, or remote service center 308. The method moves to block 1224.

In block 1224, such authorization technique is applicable when the package securing doormat frame 200 is already securing at least one of the package 302 to allow a second package delivery person to place at least one of a second package on the mat 202. The method moves to block 1226.

In block 1226, the security tarp 214 is transitioned back to the closed position, securing the package and the second package therein.

Figure 13:
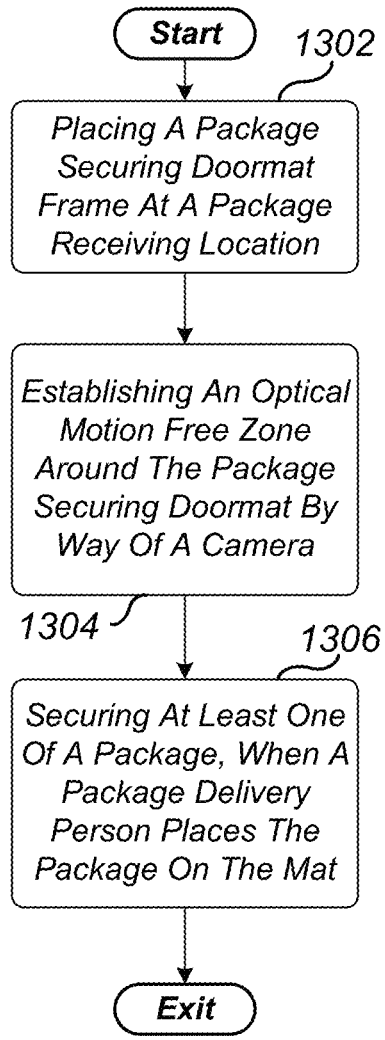
FIGS. 13 and 14 illustrate examples of a method of protecting delivered packages from theft by way of a package securing doormat frame having a concealed security tarp.

Referring to FIG. 13, there is illustrated one example of a method of protecting delivered packages from theft by way of a package securing doormat frame having a concealed security tarp. In an exemplary embodiment, the method begins in block 1302.

In block 1302, a package securing doormat frame is placed at a package receiving location. The package securing doormat frame comprises a frame 204, a securing rail 218, and a security tarp 214, the frame 204 defines an interior region for receiving at least one of a mat 202. Frame 204 has a recessed chamber 210 along at least a portion of the perimeter of frame 204. The securing rail 218 is operationally related to frame 204 and repositionable. The securing rail 218, in an open position, is located proximate to the recessed chamber 210. The method moves to block 1304.

In block 1304, an optical motion-free zone is established around the package securing doormat by way of a camera. The camera is suitable for use in connection with detecting motion, is web-enabled, and selectively data communicates at least one of a secure package notification to predefined recipients when motion is detected within the optical motion-free zone, package delivery or package delivery exception occurs by the package delivery person, or in response to a space-available request, certain of the secure package notification includes data or images from the camera.

The term "secure package notification", in the present invention, is intended to mean emails, text messages, electronic messages, icon indicators that appear on digital devices, database updates, messages sent between servers, and other types and kinds of notifications as may be required and/or desired in a particular embodiment. Such secure package notifications can be sent or otherwise appear at different status milestones in the package delivery process. As an example, when the package delivery person delivers the package, when there is a package delivery exception, or at other milestone points as may be required and/or desired in a particular embodiment.

The term "package delivery exception", in the present invention, is intended to mean a package delivery person is unable to make a scheduled package delivery for reasons such as a required signature from the recipient is unobtainable, the package is damaged in shipping, the delivery address can't be located, or for other reasons. Such package delivery exceptions, when they occur, can cause the generation of communications to predetermined recipients. Such communications can be, for example, and not a limitation, emails, text messages, electronic messages, data communications by way of the package securing system, reschedule deliveries notice generation electronic or physical paper type messages, or other types of messages as may be required and/or desired in a particular embodiment. The method moves to block 1306.

In block 1306, at least one of a package 302 is secured, when a package delivery person places the package on the mat 202, by repositioning the securing rail 218 from the open position to a closed position which extends the security tarp 214 over the package 302 entrapping the package 302 between the interior of the security tarp 214 and the interior region of the frame 204. The security tarp 214 has at least a portion secured to the frame 204 and at least a portion secured by the securing rail 218. The method is then exited.

Figure 14:
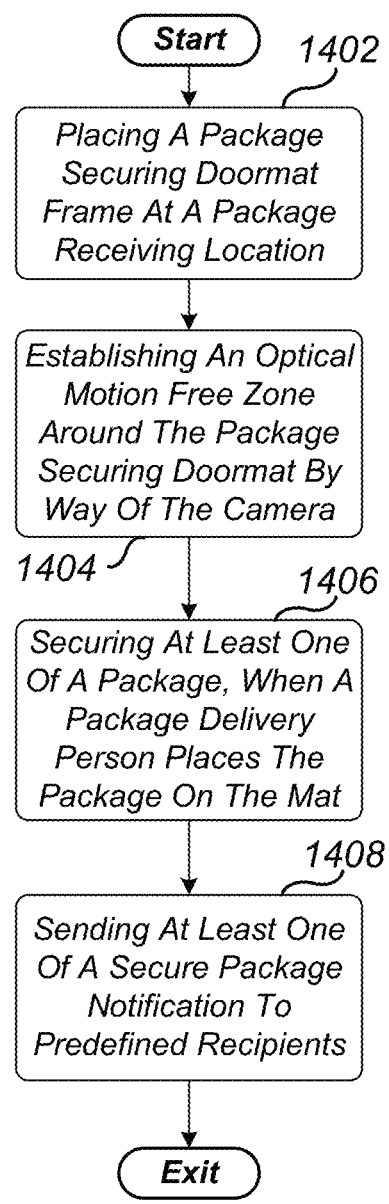

Referring to FIG. 14, there is illustrated one example of a method of protecting delivered packages from theft by way of a package securing doormat frame having a concealed security tarp. In an exemplary embodiment, the method begins in block 1402.

In block 1402, a package securing doormat frame is placed at a package receiving location. The package securing doormat frame comprising a frame 204, a securing rail 218, a security tarp 214, a camera 402/616, and a web-enabled control system 600. The frame defines an interior region for receiving at least one of a mat 202. Frame 204 has a recessed chamber 210 along at least a portion of the perimeter of frame 204. The securing rail 218 is operationally related to frame 204 and repositionable. The securing rail 218, in an open position, is located proximate to the recessed chamber The method moves to block 1404.

In block 1404, an optical motion-free zone is established around the package securing doormat frame, by way of the camera 616 that is suitable for use in connection with detecting motion and operational related to the web-enabled control system 600. The method moves to block 1606.

In block 1406, at least one of a package 302 is secured, when a package delivery person 304 places at least one of the package 302 on the mat 202, by repositioning the securing rail 218 from the open position to a closed position which extends the security tarp over the package 302 entrapping the package 302 between the interior of the security tarp and the interior region of the frame 204. The security tarp 214 has at least a portion secured to the frame 204 and at least a portion secured by the securing rail 218. The method moves to block 1408.

In block 1408, at least one of a secure package notification is sent to predefined recipients, by way of the web-enabled control system 600 or a remote control system that is in data communication with the web-enabled system 600, when motion is detected proximate to the optical motion-free zone, package delivery, or package delivery exception occurs by the package delivery person, or in response to a space-available request. Certain of the secure package notifications include data or images from the camera.

Figure 15:
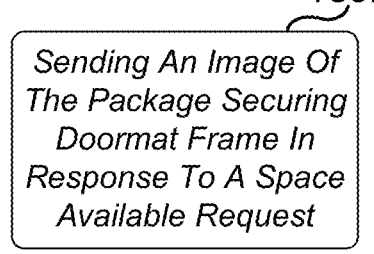
FIG. 15 illustrates exemplary embodiments of a method of protecting delivered packages from theft by way of a package securing doormat frame having a concealed security tarp.

Referring to FIG. 15 there are illustrated exemplary embodiments of a method of protecting delivered packages from theft by way of a package securing doormat frame having a concealed security tarp.

In block 1502, an image of the package securing doormat frame and surrounding area is sent, by way of the camera, in response to a space-available request. In an exemplary embodiment, a space-available request such as an electronic message or command can be data communicated to the web-enabled control system 600, camera 402/616, or other devices as may be required and/or desired in a particular embodiment.

In response to a space-available request, a camera can send an image of the package securing doormat frame and surrounding area so that the space-available request sender can see if there is space available, within the package securing doormat frame 200, for a package or if, in the alternative, the package securing doormat frame 200 is filled with packages and as such can't accept and secure any more packages until the recipient opens and removes the current secured packages.

For disclosure purposes, the camera can be an external camera that is operationally related to and/or otherwise positioned to view the package securing doormat frame 200 and the surrounding area. Alternatively, the camera can be a camera 616 that is integrated into the package securing doormat frame 200 and configured to view the package securing doormat frame 200 and the surrounding area.

Figure 16:
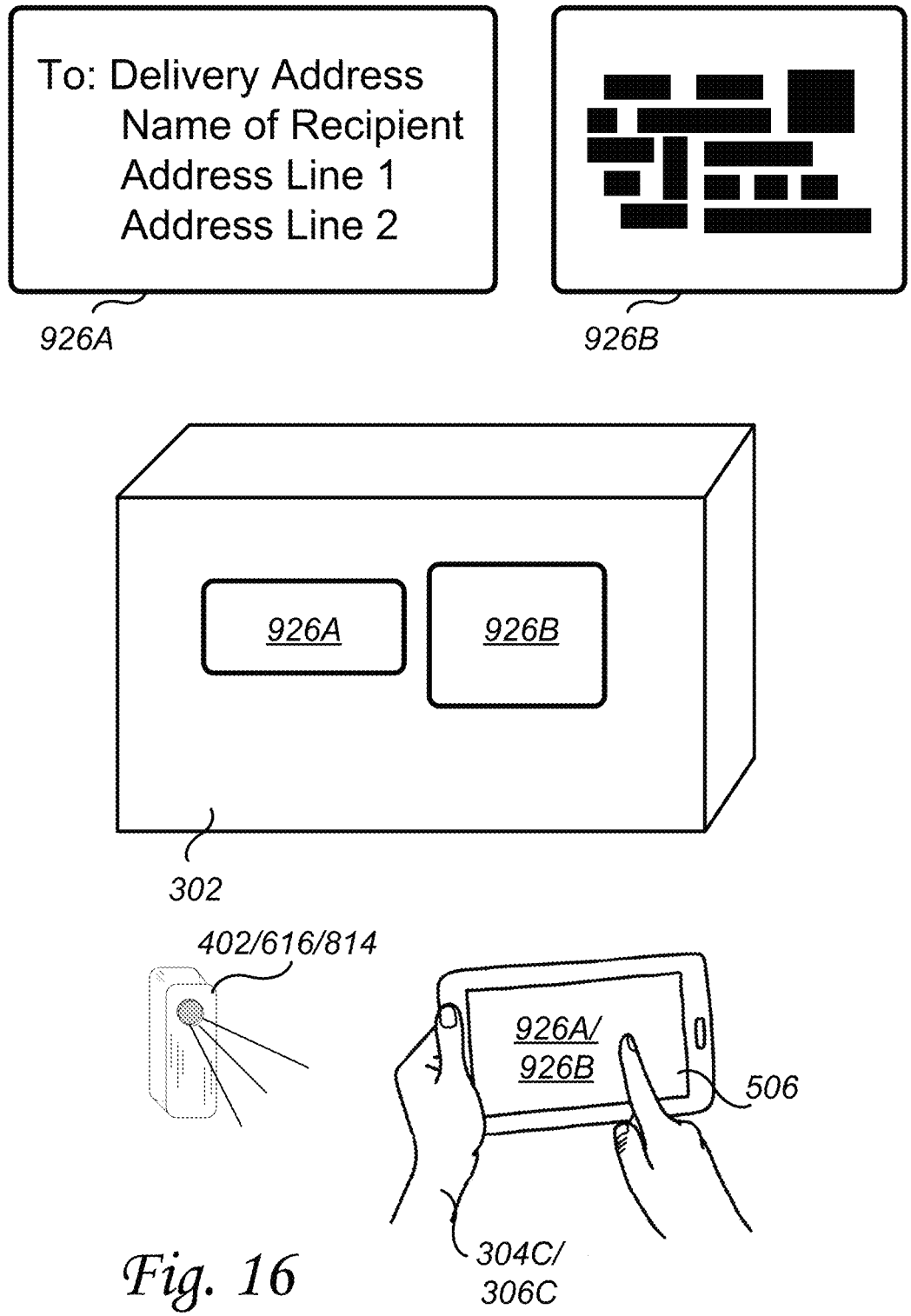
FIG. 16 illustrates examples of a package tag.

Referring to FIG. 16, there are illustrated examples of a package tag. In an exemplary embodiment, a package tag 926A can comprise indicia such as a delivery address, a sender's address, and other types and kinds of indicia. The package tag 926B can be encoded with a plurality of data in the form of a bar code, QR type code, or other types and kinds of encoded package tag data as may be required and/or desired in a particular embodiment. One or both of the package type 926A/926B styles and/or other types and kinds of styles can be used or otherwise placed on package 302 as may be required and or desired in a particular embodiment.

In another exemplary embodiment, the package tag 926A and/or 926B can be placed on package 302 and captured by a camera that is associated with a data device 506 or the vehicle web-enabled control system 800 camera 814 and displayed on the data device 506 display or the vehicle web-enabled control system 800 display 808 as a digital tag image. The data device screen displaying the digital tag image can then be presented to a camera 402/616/814 at a delivery address or pickup address by showing package 302 and/or the digital tag image displayed on the data device 506 to the camera 402/616/814.

In another exemplary embodiment, the package tag 926A and/or 926B can be retrieved from a remote data processing resource 504 and displayed on the data device 506 display or the vehicle web-enabled control system 800 display 808 as a digital tag image. The data device 506 display or the vehicle web-enabled control system 800 display 808 can then be presented to a camera 402/616 at a delivery address or pickup address by showing the digital tag image 926A/926B displayed on the data device 506 or the vehicle web-enabled control system 800 display 808 to the camera 402/616.

In an exemplary embodiment, creating, by way of the camera, a digital tag image 926A/926B of the package tag. The digital tag image 926A/926B can be data communicated to a remote data processing resource 504. An authorization to open the access door 906 or other authorization can be received from the remote data processing resource 504. Upon receipt of the authorization, the access door 904 can be transitioned to the open position, by way of the securing tether 906, wherein the open position allows package 302 to be inserted into the package receptacle 902. And securing, by transitioning the access door 904 to the closed position securing the package 302, by way of the securing tether 906, after the package 302 is inserted into the package receptacle 902.

In another exemplary embodiment, a second digital tag image of the package tag 926A/926B can be created, by way of the vehicle camera 814. A delivery address can be determined based on the second digital tag. The vehicle navigation system 822 can be programmed with the delivery address. And package 302 can be delivered to the delivery address, by way of the autonomous vehicle 920 with guidance by the vehicle navigation system 822. The autonomous vehicle can be a car/truck 920, drone 922, or other autonomous vehicles as may be required and/or desired in a particular embodiment.

In another exemplary embodiment, a second digital tag image of the package tag 926A/926B can be created, by way of the vehicle camera 814. The second digital tag image can be data communicated to the remote data processing resource 504. The delivery address is received from the remote data processing resource 504, based on the second digital tag. The vehicle navigation system 822 can be programmed with the delivery address. And package 302 can be delivered to the delivery address, by way of the autonomous vehicle with guidance by the vehicle navigation system. The autonomous vehicle can be a car/truck 920, drone 922, or other autonomous vehicles as may be required and/or desired in a particular embodiment.

In another exemplary embodiment, a vehicle web-enabled control system 800 comprising a vehicle microcontroller 802, and a vehicle display 808 is operationally related to the vehicle microcontroller 802. And an autonomous vehicle 920/922 is equipped with the vehicle web-enabled control system 800. The vehicle web-enabled control system 800 displays the package tag 926A/926B on the vehicle display 808 in a manner that is viewable by the camera 402/616. The autonomous vehicle 920/922 can be a car/truck 920, drone 922, or other autonomous vehicles.

Figure 17:
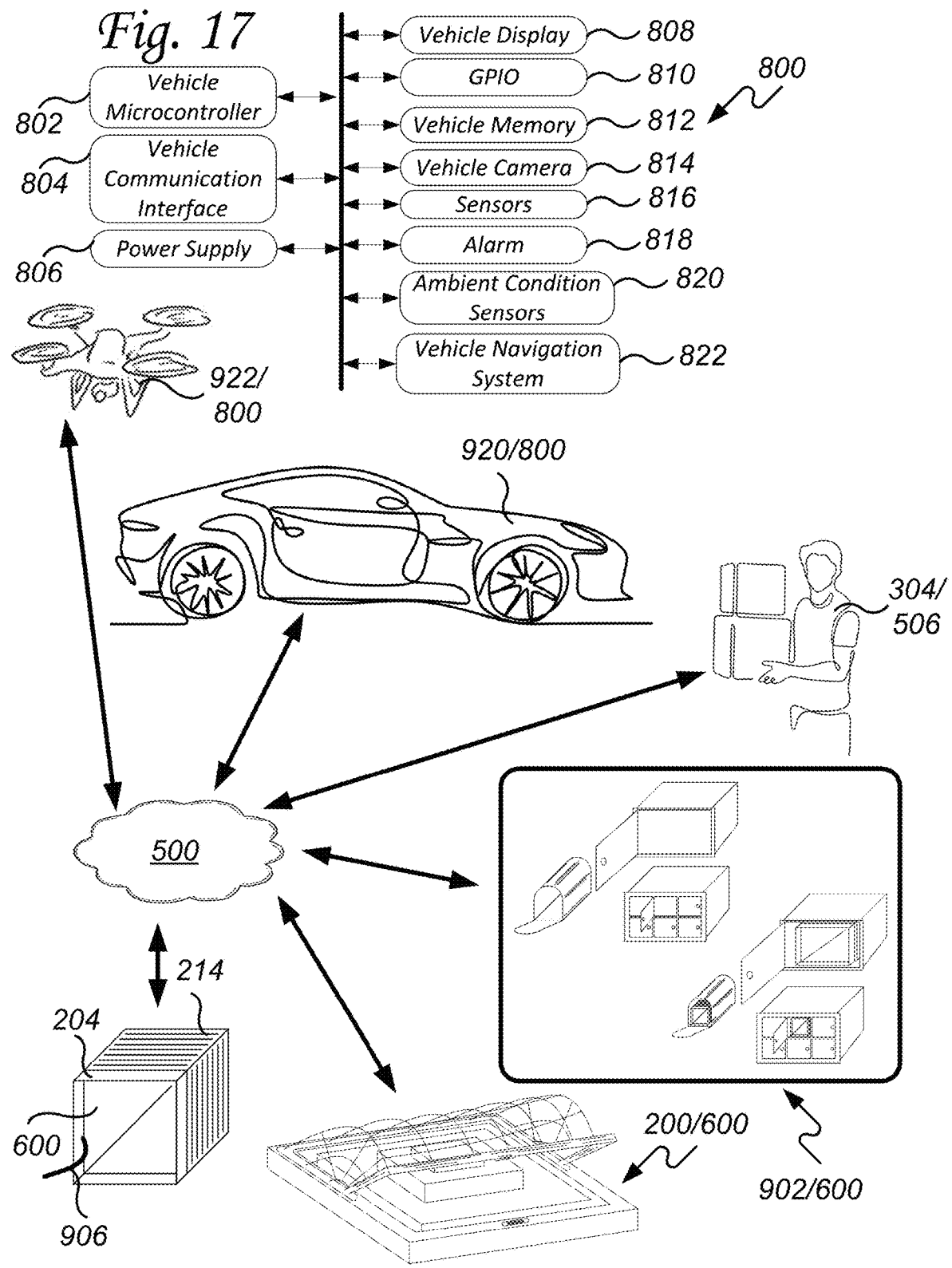
FIG. 17 illustrates one example of a vehicle web-enabled control system data communicating from a vehicle with a plurality of package receptacles and delivery persons.

Referring to FIG. 17, there is illustrated one example of a vehicle web-enabled control system 800 data communicating from a vehicle 920/922 with a plurality of package receptacles 902 and delivery person 304 by way of data device 506. In an exemplary embodiment, the package receptacle or frame 204 can be equipped with a web-enabled control system 600. Such a web-enabled control system 600 can comprise a microcontroller 602 which is operationally related to a plurality of communication interfaces 604, a power supply 606, a security tarp/securing tether controller 608, a display 610, general-purpose inputs and outputs (GPIO) interface 612, a memory 614, a camera interface 616, a plurality of sensors 618, an alarm 620, ambient condition sensors 622, a heating system 624, a cooling system 626, and global position system device 628. The security tarp/securing tether controller 608 can be interconnected with a security tarp/securing tether actuator 630.

In an exemplary embodiment, The securing tether 906 is configured to mechanically open and close door 904 with the activation and deactivation of the security tarp/securing tether actuator 630 by way of the security tarp/securing tether controller 608. The securing tether 906 can be a mechanical linkage, cable and pulley, or other types and kinds of tether systems for opening and closing the door 904 as may be required and/or desired in a particular embodiment.

A vehicle web-enabled control system 800 can comprise a vehicle microcontroller 802 which is operationally related to a vehicle communication interface 804, a power supply 806, a vehicle display 810, general-purpose inputs and outputs (GPIO) interface 812, a vehicle memory 812, a vehicle camera 814, a plurality of sensors 918, an alarm 818, ambient condition sensors 820, and vehicle navigation system 822 that includes a global position system device.

The vehicle microcontroller 802 can be INTEL, ZILOG, MICROCHIP, AMD, ARM, and/or other types or kinds of microcontrollers.

The vehicle communication interface 804 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The power supply 806 can be AC, DC, battery, solar, and/or other types and kinds of power supplies.

The vehicle display 808 can be an LCD, OLED, LED, and/or other types and kinds of display.

The GPIO 810 can be TTL, CMOS, transistors, buffers, relays, pushbutton, switch, and/or other types and of types and kinds of GPIO circuits. In an exemplary embodiment, such GPIO can be used in combination with robotic arms and other apparatus that can transfer packages from the autonomous vehicles 920/922 to the package receptacles 902 as may be required and/or desired in a particular embodiment.

The vehicle memory 812 can be combinations of RAM, ROM, flash, hard drives, solid-state drives, USB flash drives, and/or other types and kinds of memory.

The vehicle camera interface 814 can be integrated into autonomous vehicle 920/922. Also, several cameras can be utilized to create a network of camera views that can monitor a broader area. Web-enabled cameras 402 can interface to and data communicate with the vehicle camera interface 814.

The sensors 816 can be PIR motion sensors, infrared, thermal, Doppler radar, ultrasonic, capacitance, touch-type, optical, Hall effect, switch, fingerprint, and other types of biometric sensors, and/or other types and kinds of sensors.

The alarm 818 can be noise lights, relays, siren, horn, piezo buzzer, speaker, voice annunciations, and/or other types and kinds of alarms.

The ambient condition sensors 820 can be temperature, moisture, humidity, sunlight, time, date, and/or other types and kinds of sensors.

The vehicle navigation system 822 includes a global position system (GPS) device that can be used to determine the geographic location of the autonomous vehicle 920/922.

In operation, an autonomous vehicle 920/922 can be equipped with the vehicle web-enabled control system 800. The vehicle web-enabled control system 800 can display the package tag 926A/926B on the vehicle display 808 in a manner that is viewable by the camera 402/616. The autonomous vehicle can be a car/truck 920, drone 922, or other autonomous vehicles.

In an exemplary embodiment, the package receptacle 902, with or without the frame 204 and securing tarp 214 insert, can be equipped with a web-enabled control system 600 so that the package receptacle 902 can be remotely monitored and controlled. Additionally, the autonomous vehicle 920 can be equipped with the vehicle web-enabled control system 800 which through a plurality of exemplary embodiments remotely monitor and control interactions with the web-enabled control system 600 to monitor and control the package receptacle 902, with or without the frame 204 and securing tarp 214 insert.

Such remote monitoring and control can be effectuated by the package delivery person 304, the consumer 306, a remote service provider 308, the autonomous vehicle that is equipped with the vehicle web-enabled control system 800, and/or other methods as may be required and/or desired in a particular embodiment. Such remote service provider 308 can be PorchBanditProtection.com, an alarm monitoring company, a package delivery company, or other types and kinds of remote service providers.

In addition, such remote monitoring control can be by way of digital device 506 or remote data processing resource 504. Furthermore, package receptacle 902 can be operated manually, by hand, by the package delivery person 304, the consumer 306, and/or through a control panel 508, when so configured.

In an exemplary embodiment, each of the autonomous vehicles 920/922 by way of the vehicle web-enabled control system 800 can data communicate across a local area network as well as data communicate across a global network 500 with web-enabled control systems 600 and other data communicating devices and resources as may be required and/or desired in a particular embodiment. The global network 500 can be the Internet. In this regard, the autonomous vehicle 920/922, the delivery person 304 by way of a data device 506, and the package receptacles 902 having a web-enabled control system 600 with or without the frame 204 with security tarp 214 can data communicate with each other and other data communicating devices as may be required and/or desired in a particular embodiment.

Figure 18:
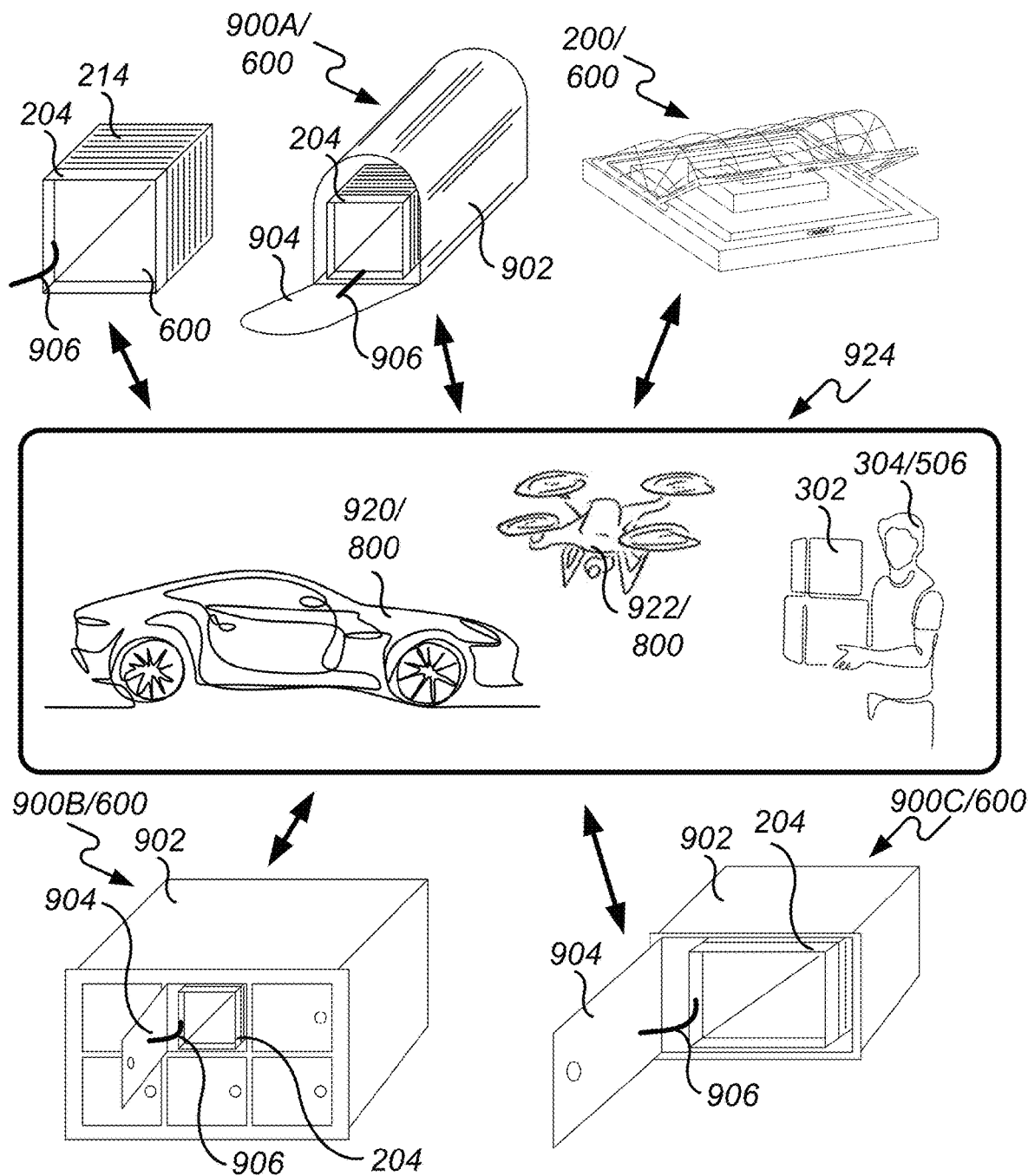
FIG. 18 illustrates examples of delivery vehicles and persons picking up or delivering package 302 to a plurality of package receptacles with and without frame and securing tarp inserts.

Referring to FIG. 18, there are illustrated examples of delivery vehicles and persons 924 picking up or delivering the package 302 to a plurality of package receptacles 902 with and without frame 204 and securing tarp 214 inserts. In an exemplary embodiment, an autonomous vehicle 920 equipped with a vehicle web-enabled control system 800, a drone 922 equipped with a vehicle web-enabled control system 800, or a delivery person 304 equipped with a data device 506 can data communicate and otherwise interact with a plurality of package receptacles 902 with and without frame 204 and securing tarp 214 inserts, and doormat 200 to make package 302 pickups or deliveries. The autonomous vehicle can be a car/truck 920, drone 922, or other autonomous vehicles.

In operation, in an exemplary embodiment, either an existing package receptacles 902 can be fitted with a web-enabled control system and a tether that is attachable to the package receptacle door 904 or a frame 204 with security tarp 214, a web-enabled control system 600, and a tether 906 that is attachable to a package receptacle door 904 can be inserted and resized to fit inside a package receptacle 902. Such frame 204 with security tarp 214 inserts can be fitted into arch-shaped package receptacle 902 mailboxes 900A, panel type package receptacle 902 mailboxes 900B, large size package receptacle 902 mailbox 900C, and other package receptacles 902 as may be required and/or desired in a particular embodiment. The securing tether 906 can be a mechanical linkage, cable and pulley, or other types and kinds of tether systems for opening and closing the door 904 as may be required and/or desired in a particular embodiment.

Figure 19:
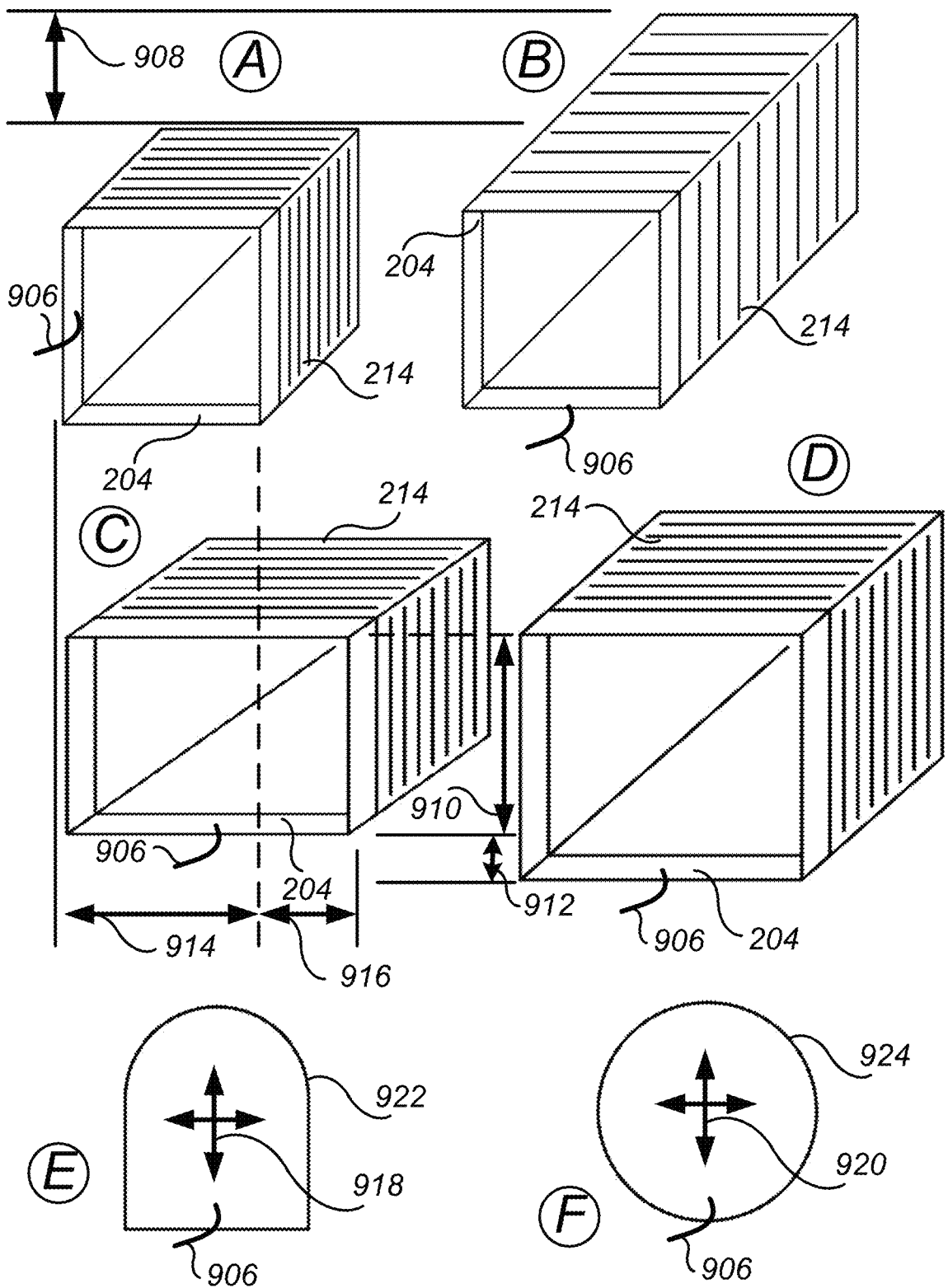
FIG. 19 illustrates examples of a resizable frame and security tarp package receptacle insert.

Referring to FIG. 19, there are illustrated examples of a resizable frame and security tarp package receptacle insert. In an exemplary embodiment, in reference 'A' a frame 204 with security tarp 214 attached can have incorporated therein a web-enabled control system 600 and a tether 906. The tether can be attached to a package receptacle door 904. In operation, The securing tether 906 can open and close the package receptacle door 904 by way of the security tarp/securing tether actuator 630.

To accommodate different sizes and shapes of package receptacles 902, the frame 204, and the security tarp insert can be resized by changing the aperture size of the frame 204 and the length and width of security tarp 214. In this regard, in reference 'B the length 908 can be changed to accommodate different length package receptacles. In reference 'C' the width 914 can be changed 916 to accommodate different width package receptacles 902. In reference 'D' the height 910 can be changed 912 to accommodate different heights of the package receptacle 902. In general, the height, width, and length of the frame 204 and attached security tarp can be changed to fit different size and shape package receptacles 902 as may be required and/or desired in a particular embodiment.

In addition, the frame 204 shape can be changed. In this regard, in reference 'E' the frame 204 shape can be an arch shape that is resizable in at least the width and height 918 directions. And in reference 'F' the frame 204 shape can be a circle that is resizable in at least the width and height 920 directions. In other embodiments, the shape of frame 204 can be other shapes and resizable in at least the width and height directions.

In an exemplary embodiment, the securing tarp 214 has at least one of an opening that defines an interior region. A frame 204 is fastened to the opening of the securing tarp 214 and fastened into the package receptacle 902. The package can be inserted into the interior region for same keeping.

In an exemplary embodiment, the frame 204 and the securing tarp 214 are resizable to fit with the package receptacle 902.

In another exemplary embodiment, at least a portion of the web-enabled control system 600 is packaged within the frame 204.

Referring to FIG. 20 there are illustrated examples of package receptacles 902A-F with and without frame 204 with security tarp 214 insert. In an exemplary embodiment, an advantage in the present invention is that the frame 204/security tarp 214 insert can be inserted into the existing package receptacles 902A-C to retrofit them to work with the methods of the present invention. Or in the alternative, the package receptacles 902D-F can incorporate the web-enabled control system, tether 906, and other necessary technology to work with the methods of the present invention without the frame 204/security tarp 214 insert.

Figure 21:
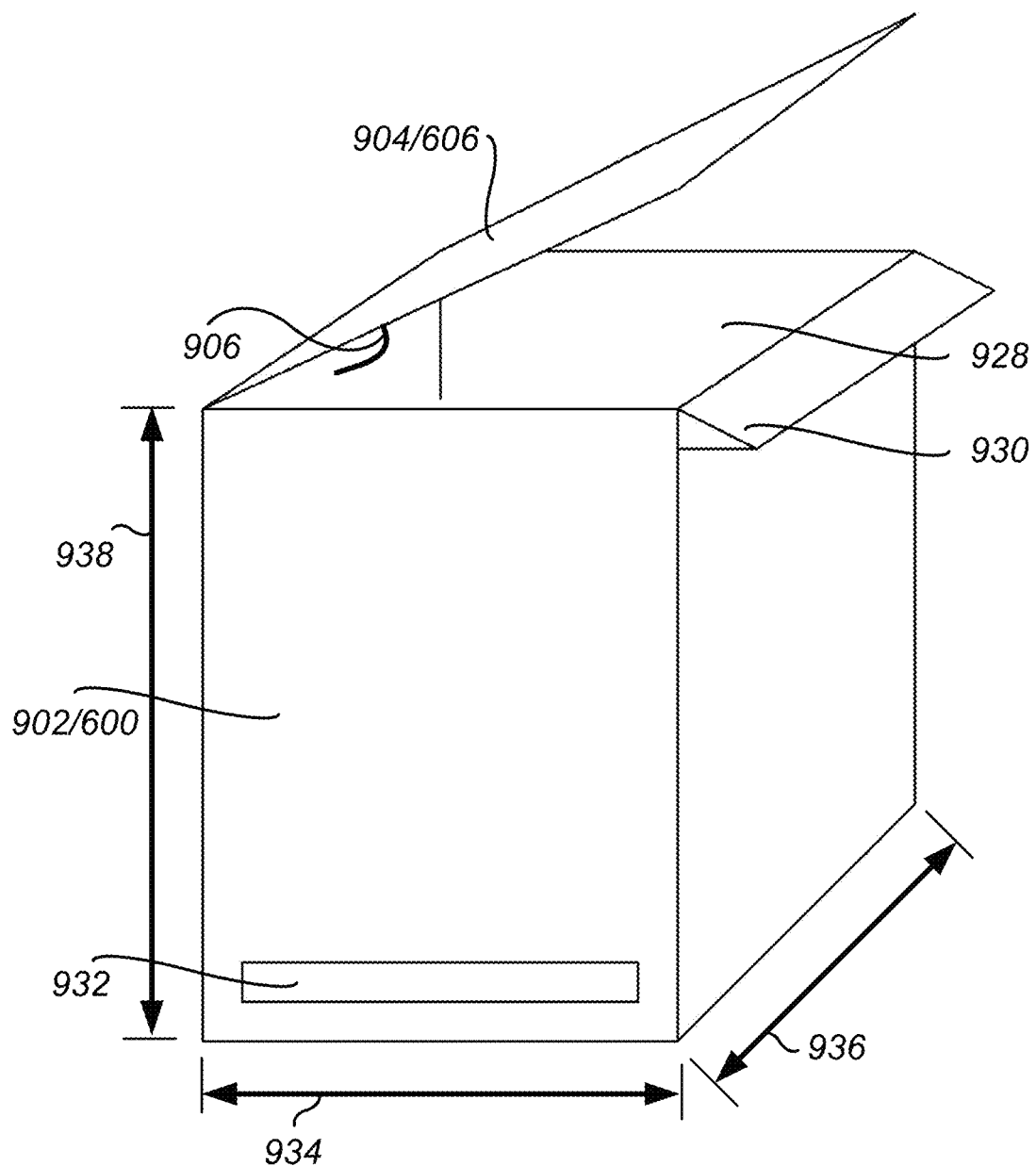
FIG. 21 illustrates one example of a package receptacle.

Referring to FIG. 21, there is illustrated one example of a package receptacle 902. In an exemplary embodiment, the package receptacle 902 can be in the range of 24 inches to 60 inches in width 934 and preferable in the range of 30 inches to 40 inches in width 934. Package receptacle 902 can be in the range of 24 inches to 60 inches in length 936 and preferable in the range of 30 inches to 40 inches in length 936. Package receptacle 902 can be in the range of 24 inches to 60 inches in height 938 and preferable in the range of 36 inches to 48 inches in height 938.

A lower slot 930 can allow letters and other smaller packages 302 to be slipped into the parcel receptacle 902 without the need to raise door 904, the door 904 remaining in the closed position. A larger opening 928 allows larger packages to be placed in the package receptacle 902 when the door 904 is in the open position.

Package receptacle can be configured with a web-enabled control system 600 and tether 906 which by way of securing tether actuator 930 repositions the door 904 in the opened and closed position, in accordance with the methods of the present invention.

A slot along at least one of the bottom edges 932 can be used to lift and/or move the package receptacle 902 by a robot, dolly, or other methods as may be required and/or desired in a particular embodiment.

In an exemplary embodiment, a power source 606 such as a solar panel can be affixed to the package receptacle door 904. In this regard, the solar panel power source 606 can be configured to use sunlight to charge a battery which in turn can power the web-enabled control system 600 to effectuate the operation of the package receptacle 902.

Referring to FIG. 22, there is illustrated an exemplary embodiment of a method used with a package securing system. In an exemplary embodiment, a package receptacle 902 has an access door 904, and a web-enabled control system 600 comprising a microcontroller 602, a camera 402/616, a securing tether actuator 630, and a memory 614. Each of the camera 402/616, the securing tether actuator 630, and the memory 614 are operationally related to the microcontroller 602. A securing tether 906 is attached to the access door 904. The securing tether 906 is operationally related to the securing tether actuator 930 and repositions the access door 904 in an open or a closed position. A package tag 926A/926B comprises a plurality of data that is associated with package 302. The securing tether 906 can be a mechanical linkage, cable and pulley, or other types and kinds of tether systems for opening and closing the door 904 as may be required and/or desired in a particular embodiment The method starts in step 1602 where the memory 614 is encoded with instructions that when executed by the microcontroller 602 perform the step creating, by way of the camera 402/616, a digital tag image of the package tag 926A/926B. The method then moves to step 1604.

In step 1604, the digital tag image is data communicated to a remote data processing resource 504. The method then moves to step 1606.

In step 1606, authorization is received, from the remote data processing resource. In this regard, the digital tag image can be processed and used to validate or otherwise approve access to the package receptacle. Pickup and deliveries can also be logged in a database 502 and otherwise processed as may be required and/or desired in a particular embodiment. The method then moves to step 1608.

In step 1608, upon receipt of the authorization, access door 904 can be transitioned to the open position, by way of the securing tether 906, wherein the open position allows package 302 to be inserted into the package receptacle 902. The method then moves to step 1610.

In step 1610, the package receptacle 902 is secured, by transitioning the access door 904 to the closed position, by way of the securing tether 906, after the package 302 is inserted into the package receptacle 902. The method is then exited.

Referring to FIG. 23 there is illustrated an exemplary embodiment of a method used with a package securing system. The vehicle web-enabled control system 800 comprises a vehicle navigation system 822, a vehicle camera 814, and a vehicle memory 812. Each of the vehicle navigation system 822, the vehicle camera 814, and the vehicle memory 812 are operationally related to the vehicle microcontroller 802.

The method starts in step 1702, where the vehicle memory 812 is encoded with instructions that when executed by the vehicle microcontroller 802 performs the step of creating, by way of the vehicle camera 814, a second digital tag image of the package tag 926A/926B. In this regard, camera 814 takes a picture of the package tag 926A/926B to create the second digital tag image. The method then moves to step 1704.

In step 1704, a delivery address is determined based on the second digital tag. In this regard, the second digital image can be parsed and a delivery address can be determined or queried from a remote data processing resource 504 or other sources. The method then moves to step 1706.

In step 1706, the vehicle navigation system 822 can be programmed with the delivery address. The method then moves to step 1708.

In step 1708, the package is delivered to the delivery address, by way of the autonomous vehicle 920 and/or drone 922 with guidance by the vehicle navigation system 822. The autonomous vehicle can be a car/truck 920, drone 922, or other autonomous vehicles. The method is then exited.

Figure 24:
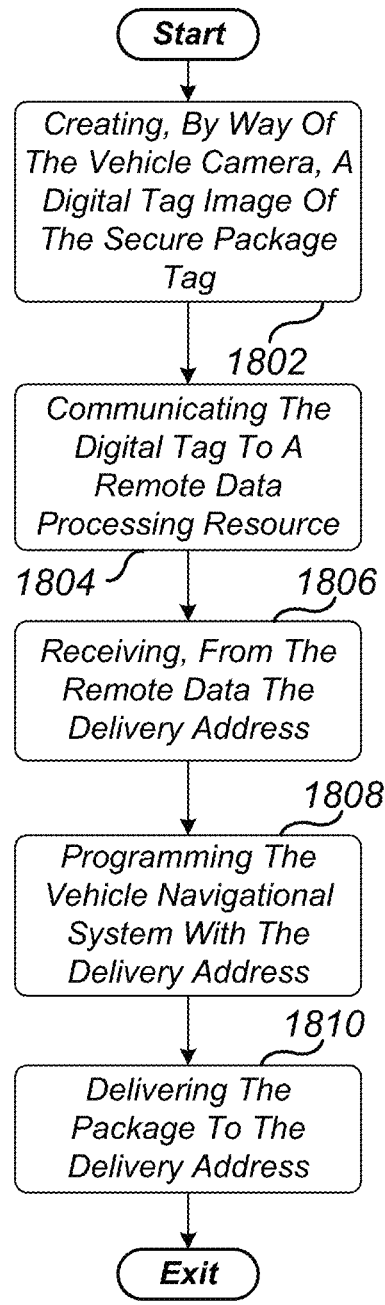

Referring to FIG. 24 there is illustrated an exemplary embodiment of a method used with a package securing system. In an exemplary embodiment, the vehicle web-enabled control system 800 comprises a vehicle navigation system 832, a vehicle camera 814, and a vehicle memory 812. Each of the vehicle navigation system 832, the vehicle camera 814, and the vehicle memory 812 are operationally related to the vehicle microcontroller 802.

The method starts in step 1802, where the vehicle memory 812 is encoded with instructions that when executed by the vehicle microcontroller 802 performs the step of creating, by way of the vehicle camera 814, a second digital tag image of the package tag 926A/926B. In this regard, camera 814 takes a picture of the package tag 926A/926B to create the second digital tag image. The method moves to step 1804.

In step 1804, the second digital tag image can be data communicated to the remote data processing resource 504. The method then moves to step 1806.

In step 1806, the delivery address is received from the remote data processing resource, based on the second digital tag. In this regard, the second digital image can be parsed and a delivery address can be determined or queried from the remote data processing resource 504 or other sources. The method then moves to step 1808.

In step 1808, the vehicle navigation system 833 can be programmed with the delivery address. The method then moves to step 1810.

In step 1810, package 302 is delivered to the delivery address, by way of the autonomous vehicle 920 and/or drone 922, with guidance by the vehicle navigation system 822. The autonomous vehicle can be a car/truck 920, drone 922, or other autonomous vehicles. The method is then exited.

Figure 25:
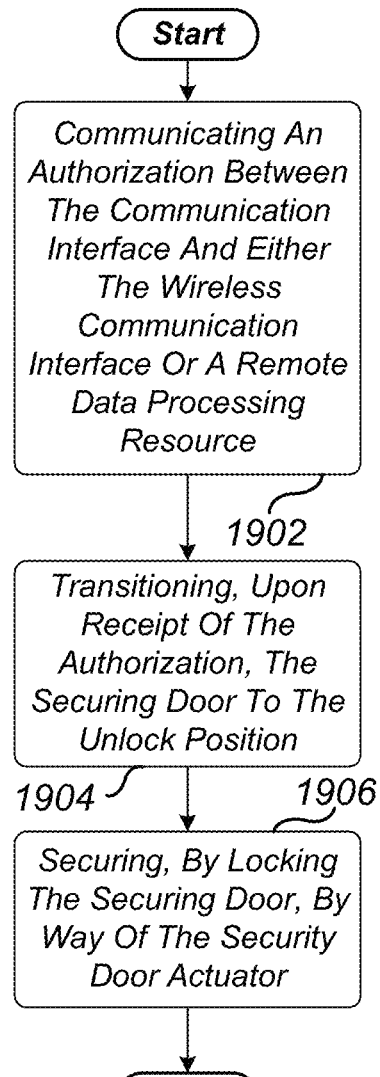

Referring to FIG. 25 there is illustrated an exemplary embodiment of a method used with a package securing system. In an exemplary embodiment, a package receptacle 902 has an access door 904. A vehicle web-enabled control system 800 comprises a vehicle microcontroller 802, a vehicle navigation system 822, a vehicle communication interface 804, and a vehicle memory 812. Each of the vehicle navigation system 822, the vehicle communication interface 804, the vehicle memory 812 are operationally related to the vehicle microcontroller 802. An autonomous vehicle 920/922 is equipped with the vehicle web-enabled control system 800. The autonomous vehicle 920/922 is a car, truck, or drone.

A web-enabled control system 600 comprises a microcontroller 602, a communication interface 604, a securing tether actuator 630, and a memory 614. Each of the communication interface 604, the securing tether actuator 630, and the memory 614 are operationally related to the microcontroller 602. A securing tether 906 is attached to the access door 904. The securing tether 906 is operationally related to the securing tether actuator 630 and repositions the access door 904 in an open or a closed position. The securing tether 906 is configured to mechanically open and close door 904 with the activation and deactivation of the security tarp/securing tether actuator 630 by way of the security tarp/securing tether controller 608. The securing tether 906 can be a mechanical linkage, cable and pulley, or other types and kinds of tether systems for opening and closing the door 904 as may be required and/or desired in a particular embodiment.

The method starts in step 1902 where the memory 614 is encoded with instructions that when executed by the microcontroller 602 performs the steps of communicating an authorization between the communication interface 604 and either the vehicle communication interface 804 or a remote data processing resource 504. In this regard, the authorization can be an approval to access the package receptacle 902. The method then moves to step 1904.

In step 1904, upon receipt of the authorization, access door 904 is transitioned to the open position, by way of the securing tether 906, wherein the open position allows package 302 to be inserted into the package receptacle 902. The method then moves to step 1906.

In step 1906, access door 904 is secured by transitioning the access door 904 to the closed position, by way of the securing tether 906, after package 302 is inserted into the package receptacle 902. The method is then exited.

Figure 26:
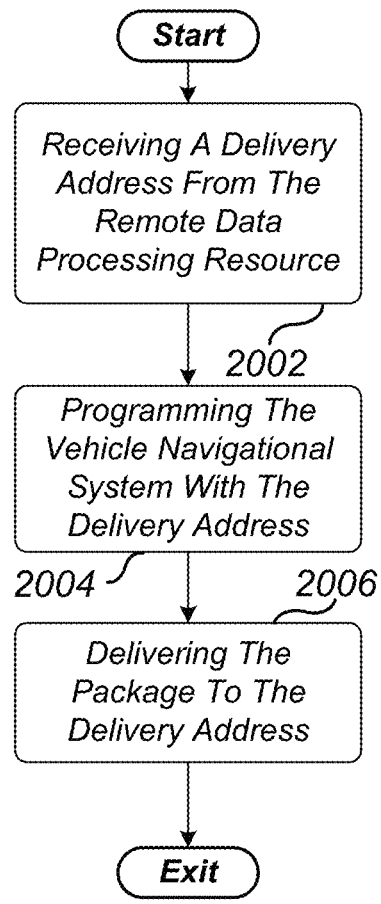

Referring to FIG. 26 there is illustrated an exemplary embodiment of a method used with a package securing system. In an exemplary embodiment, the method starts in step 2002 where the vehicle memory 812 is encoded with instructions that when executed by the vehicle microcontroller 802 perform the steps of receiving a delivery address, from the remote data processing resource 504. The method then moves to step 2004.

In step 2004, the vehicle navigation system is programmed with the delivery address. The method then moves to step 2006.

In step 2006, the package is delivered to the delivery address, by way of the autonomous vehicle with guidance by the vehicle navigation system. The autonomous vehicle can be a car/truck 920, drone 922, or other autonomous vehicles. The method is then exited.

Figure 27:
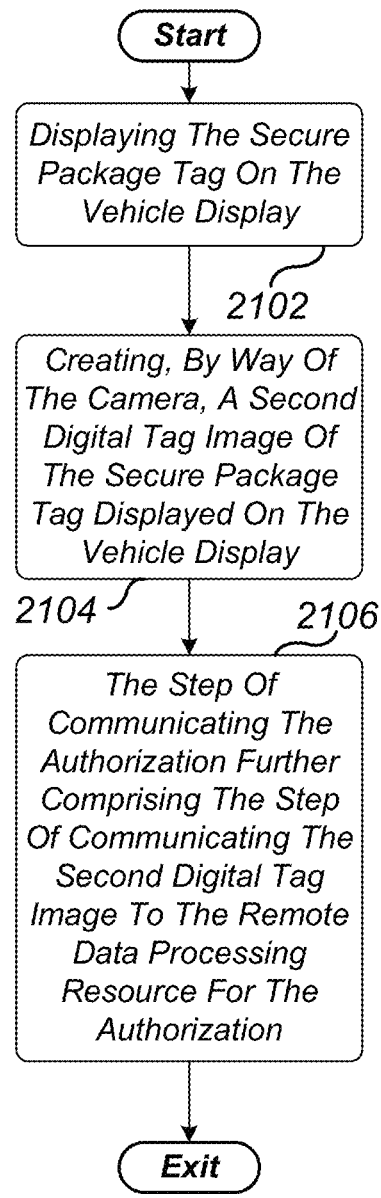

Referring to FIG. 27 there is illustrated an exemplary embodiment of a method used with a package securing system. In an exemplary embodiment, a package tag 926A/926B is associated with package 302. A vehicle display 808 is operationally related to the vehicle web-enabled control system. A vehicle camera 814 is operationally related to the microcontroller 802.

The method starts in step 2102 where the vehicle memory 812 is encoded with instructions that when executed by the vehicle microcontroller 802 performs the steps of displaying the package tag 926A/926B on the vehicle display 808. The method then moves to step 2104.

In step 2104, by way of the camera 402/616, a second digital tag image is created of the package tag 926A/926B displayed on the vehicle display 808. The method then moves to step 2106.

In step 2106, the step of communicating the authorization further comprises data communicating the second digital tag image to the remote data processing resource 504 for the authorization. In this regard, the authorization can be an approval to access the package receptacle 902. The method is then exited.

Figure 28:
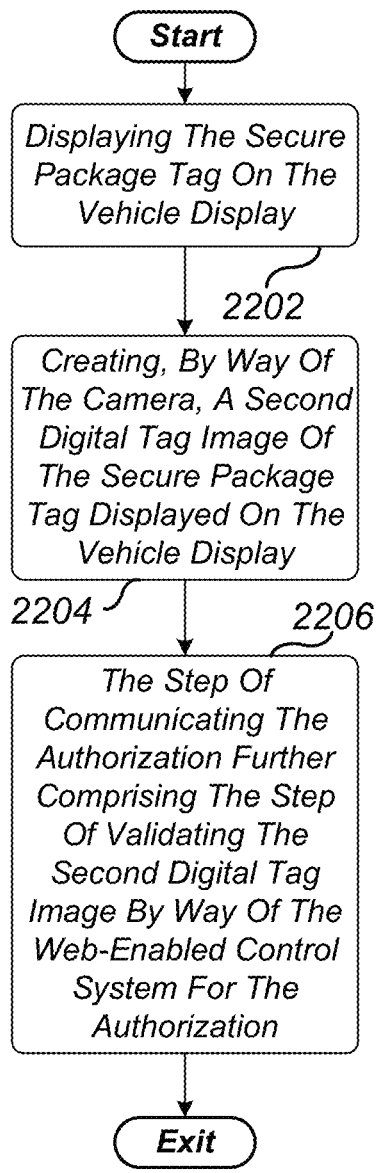

Referring to FIG. 28 there is illustrated an exemplary embodiment of a method used with a package securing system. In an exemplary embodiment, a package tag 926A/926B is associated with package 302. A vehicle display 808 is operationally related to the vehicle web-enabled control system 800. A camera 402/616 is operationally related to the web-enabled control system 600.

The method starts in step 2202, where the memory 614 and the vehicle memory 812 are encoded with instructions that when executed by the microcontroller 602 and the vehicle microcontroller 802 perform the step of displaying the package tag 926A/926B on the vehicle display 808. The method then moves to step 2204.

In step 2204, by way of the camera 402/616, a second digital tag image is created of the package tag 926A/926B displayed on the vehicle display 808. The method then moves to step 2206.

In step 2206, the step of communicating the authorization further comprises validating the second digital tag image by way of the web-enable control system 600 for the authorization. In this regard, the authorization can be an approval to access the package receptacle 902. The method is then exited.

Figure 29:
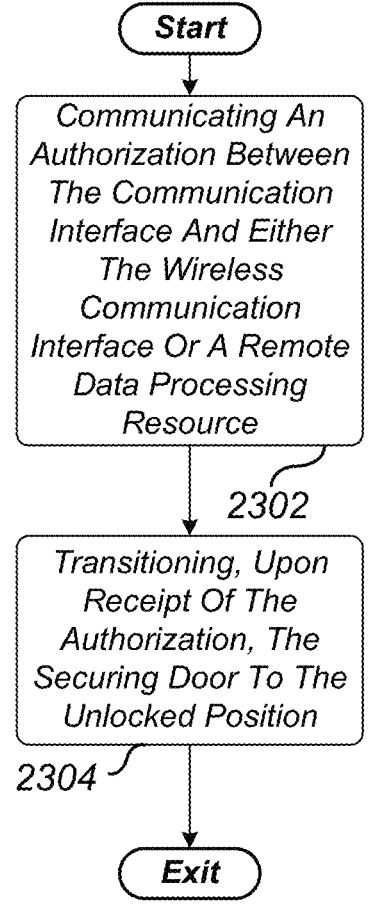

Referring to FIG. 29 there is illustrated an exemplary embodiment of a method used with a package securing system. In an exemplary embodiment, a package receptacle 902 has an access door 904. A package 302 can be placed within the package receptacle 902 for pickup. A vehicle web-enabled control system 600 comprises a vehicle microcontroller 802, a vehicle navigation system 822, a vehicle communication interface 804, and a vehicle memory 812. Each of the vehicle navigation system 822, the vehicle communication interface 822, and the vehicle memory 812 are operationally related to the vehicle microcontroller 802. An autonomous vehicle 920/922 is equipped with the vehicle web-enabled control system 800. The autonomous vehicle 920/922 is a car, truck, drone, or other autonomous vehicle. A web-enabled control system 600 comprises a microcontroller 602, a securing tether actuator 630, and a memory 614. Each of the securing tether actuator 630, and the memory 614 are operationally related to the microcontroller 602. A securing tether 906 is attached to the access door 904. The securing tether 906 is operationally related to the securing tether actuator 630 and repositions the access door 904 in an open or a closed position.

The method starts in step 2302 where the memory 614 is encoded with instructions that when executed by the microcontroller 602 performs the step of communicating an authorization between the communication interface 604 and either the vehicle communication interface 804 or a remote data processing resource 504. The method then moves to step 2304.

In step 2304, upon receipt of the authorization, access door 904 is transitioned to the open position, by way of the securing tether 906, wherein the open position allows package 302 to be removed from the package receptacle 902. The method is then exited.

Figure 30:
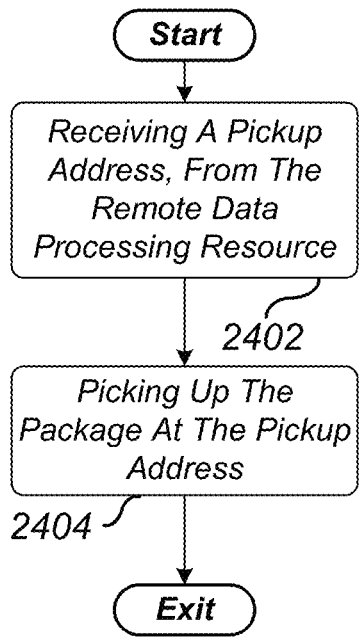

Referring to FIG. 30 there is illustrated an exemplary embodiment of a method used with a package securing system. In an exemplary embodiment, the method starts in step 2402 where the vehicle memory 812 is encoded with instructions that when executed by the vehicle microcontroller 802 performs the step of receiving a pickup address, from the remote data processing resource 504. The method then moves to step 2404.

In step 2204, package 302 is picked up at the pickup address, by way of the autonomous vehicle 920/922 with guidance by the vehicle navigation system 822. The autonomous vehicle can be a car/truck 920, drone 922, or other autonomous vehicles. The method is then exited.

Figure 31:
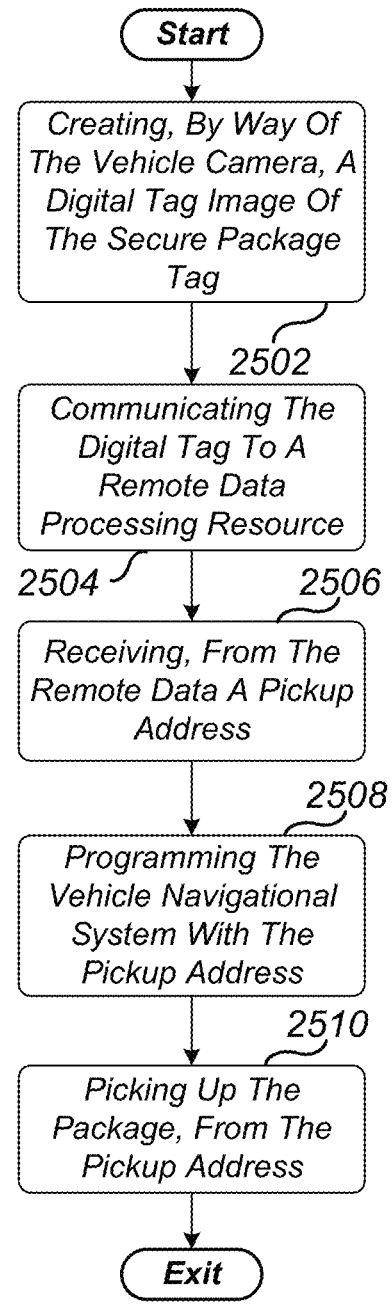

Referring to FIG. 31 there is illustrated an exemplary embodiment of a method used with a package securing system. In an exemplary embodiment, a package tag 926A/926B is associated with package 302. A vehicle camera 814 is operationally related to the vehicle web-enabled control system 800.

The method starts in step 2502, where the vehicle memory 812 is encoded with instructions that when executed by the vehicle microcontroller performs the step of creating, by way of the vehicle camera 814, a second digital tag image of the package tag 926A/926B. In this regard, camera 814 takes a picture of the package tag 926A/926B to create the second digital tag image. The method moves to step 2504.

In step 2504, the second digital tag image is communicated to the remote data processing resource 504. The method then moves to step 2506.

In step 2506, the pickup address is received from the remote data processing resource 504. In this regard, the second digital image can be parsed and a pickup address can be determined or queried from the remote data processing resource 504 or other sources. The method then moves to step 2508.

In step 2508, the vehicle navigation system 822 can be programmed with the pickup address. The method then moves to step 2510.

In step 2510, the package is picked up, from the pickup address, by way of the autonomous vehicle 920/922 with guidance by the vehicle navigation system 822. The autonomous vehicle can be a car/truck 920, drone 922, or other autonomous vehicles. The method is then exited.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A package securing system comprising:
   a package receptacle having an access door;
   a securing tarp having at least one of an opening that defines an interior region;
   a frame is fastened to the opening of the securing tarp and fastened into the package receptacle, the package can be inserted into the interior region;
   a web-enabled control system comprising a microcontroller, a camera, a securing tether actuator, and a memory, each of the camera, the securing tether actuator, and the memory is operationally related to the microcontroller;
   a securing tether is attached to the access door, the securing tether is operationally related to the securing tether actuator and repositions the access door in an open or a closed position;
   a package tag comprising a plurality of data that is associated with a package, the memory is encoded with instructions that when executed by the microcontroller perform the steps of:
      creating, by way of the camera, a digital tag image of the package tag;
      communicating the digital tag image to a remote data processing resource;
      receiving, from the remote data processing resource, an authorization;
      transitioning, upon receipt of the authorization, the access door to the open position, by way of the securing tether, wherein the open position allows the package to be inserted into the package receptacle; and
      securing, by transitioning the access door to the closed position, by way of the securing tether, after the package is inserted into the package receptacle.

2. The package securing system in accordance with claim 1, the frame and the securing tarp are resizable to fit within the package receptacle.

3. The package securing system in accordance with claim 1, at least a portion of the web-enabled control system is packaged within the frame.

4. The package securing system in accordance with claim 1, further comprises:
   a vehicle web-enabled control system comprising a vehicle microcontroller, and a vehicle display that is operationally related to the vehicle microcontroller; and
   an autonomous vehicle is equipped with the vehicle web-enabled control system, the vehicle web-enabled control system displays the package tag on the vehicle display in a manner that is viewable by the camera, the autonomous vehicle is a car, truck, or drone.

5. The package securing system in accordance with claim 4, further comprises:
   the vehicle web-enabled control system comprising a vehicle navigation system, a vehicle camera, and a vehicle memory, each of the vehicle navigation system, the vehicle camera, and the vehicle memory are operationally related to the vehicle microcontroller, the vehicle memory is encoded with instructions that when executed by the vehicle microcontroller performs the steps of:
creating, by way of the vehicle camera, a second digital tag image of the package tag;
determining a delivery address based on the second digital tag;
programming the vehicle navigation system with the delivery address; and
delivering the package to the delivery address, by way of the autonomous vehicle with guidance by the vehicle navigation system.

6. The package securing system in accordance with claim 4, further comprises:
the vehicle web-enabled control system comprising a vehicle navigation system, a vehicle camera, and a vehicle memory, each of the vehicle navigation system, the vehicle camera, and the vehicle memory are operationally related to the vehicle microcontroller, the vehicle memory is encoded with instructions that when executed by the vehicle microcontroller performs the steps of:
creating, by way of the vehicle camera, a second digital tag image of the package tag;
communicating the second digital tag image to the remote data processing resource;
receiving the delivery address, from the remote data processing resource, based on the second digital tag;
programming the vehicle navigation system with the delivery address; and
delivering the package to the delivery address, by way of the autonomous vehicle with guidance by the vehicle navigation system.

7. A package securing system comprising:
a package receptacle having an access door;
a securing tarp having at least one of an opening that defines an interior region;
a frame is fastened to the opening of the securing tarp and fastened into the package receptacle, the package can be inserted into the interior region;
a vehicle web-enabled control system comprising a vehicle microcontroller, a vehicle navigation system, a vehicle communication interface, and a vehicle memory, each of the vehicle navigation system, the vehicle communication interface, the vehicle memory are operationally related to the vehicle microcontroller;
an autonomous vehicle is equipped with the vehicle web-enabled control system, the autonomous vehicle is a car, truck, or drone;
a web-enabled control system comprising a microcontroller, a communication interface, a securing tether actuator, and a memory, each of the communication interface, the securing tether actuator, and the memory is operationally related to the microcontroller;
a securing tether is attached to the access door, the securing tether is operationally related to the securing tether actuator and repositions the access door in an open or a closed position, the memory is encoded with instructions that when executed by the microcontroller performs the steps of:
communicating an authorization between the communication interface and either the vehicle communication interface or a remote data processing resource;
transitioning, upon receipt of the authorization, the access door to the open position, by way of the securing tether, wherein the open position allows the package to be inserted into the package receptacle; and
securing, by transitioning the access door to the closed position, by way of the securing tether, after the package is inserted into the package receptacle.

8. The package securing system in accordance with claim 7, the frame and the securing tarp are resizable to fit within the package receptacle.

9. The package securing system in accordance with claim 7, at least a portion of the web-enabled control system is packaged within the frame.

10. The package securing system in accordance with claim 7, the vehicle memory is encoded with instructions that when executed by the vehicle microcontroller perform the steps of:
receiving a delivery address, from the remote data processing resource;
programming the vehicle navigation system with the delivery address; and
delivering the package to the delivery address, by way of the autonomous vehicle with guidance by the vehicle navigation system.

11. The package securing system in accordance with claim 7, further comprises:
a package tag is associated with the package;
a vehicle display is operationally related to the vehicle web-enabled control system;
a camera is operationally related to the microcontroller, the vehicle memory is encoded with instructions that when executed by the vehicle microcontroller performs the steps of:
displaying the package tag on the vehicle display;
creating, by way of the camera, a second digital tag image of the package tag displayed on the vehicle display;
the step of communicating the authorization further comprising:
communicating the second digital tag image to the remote data processing resource for the authorization.

12. The package securing system in accordance with claim 7, further comprises:
a package tag is associated with the package;
a vehicle display is operationally related to the vehicle web-enabled control system;
a camera is operationally related to the web-enabled control system, the memory and the vehicle memory are encoded with instructions that when executed by the microcontroller and the vehicle microcontroller perform the steps of:
displaying the package tag on the vehicle display; and
creating, by way of the camera, a second digital tag image of the package tag displayed on the vehicle display;
the step of communicating the authorization further comprising:
validating the second digital tag image by way of the web-enable control system for the authorization.

13. A package securing system comprising:
a package receptacle having an access door, and a package placed within the package receptacle for pickup;
a securing tarp having at least one of an opening that defines an interior region;
a frame is fastened to the opening of the securing tarp and fastened into the package receptacle, the package can be inserted into the interior region;

a vehicle web-enabled control system comprising a vehicle microcontroller, a vehicle navigation system, a vehicle communication interface, and a vehicle memory, each of the vehicle navigation system, the vehicle communication interface, and the vehicle memory are operationally related to the vehicle microcontroller;

an autonomous vehicle is equipped with the vehicle web-enabled control system, the autonomous vehicle is a car, truck, or drone;

a web-enabled control system comprising a microcontroller, a communication interface, a securing tether actuator, and a memory, each of the communication interface, the securing tether actuator, and the memory are operationally related to the microcontroller;

a securing tether is attached to the access door, the securing tether is operationally related to the securing tether actuator and repositions the access door in an open or a closed position, the memory is encoded with instructions that when executed by the microcontroller performs the steps of:

communicating an authorization between the communication interface and either the vehicle communication interface or a remote data processing resource; and transitioning, upon receipt of the authorization, the access door to the open position, by way of the securing tether, wherein the open position allows the package to be removed from the package receptacle.

14. The package securing system in accordance with claim 13, further comprises:

a package tag is associated with the package;

a vehicle display is operationally related to the vehicle web-enabled control system;

a camera is operationally related to the web-enabled control system, the memory and the vehicle memory are encoded with instructions that when executed by the microcontroller and the vehicle microcontroller perform the steps of:

displaying the package tag on the vehicle display; and creating, by way of the camera, a second digital tag image of the package tag displayed on the vehicle display;

the step of communicating the authorization further comprising:

communicating the second digital tag image to the remote data processing resource for the authorization.

15. The package securing system in accordance with claim 13, further comprises:

a package tag is associated with the package;

a vehicle display is operationally related to the vehicle web-enabled control system;

a camera is operationally related to the web-enabled control system, the memory and the vehicle memory are encoded with instructions that when executed by the microcontroller and the vehicle microcontroller perform the steps of:

displaying the package tag on the vehicle display; and creating, by way of the camera, a second digital tag image of the package tag displayed on the vehicle display;

the step of communicating the authorization further comprising:

validating the second digital tag image by way of the web-enable control system for the authorization.

16. The package securing system in accordance with claim 13, the vehicle memory is encoded with instructions that when executed by the vehicle microcontroller performs the steps of:

receiving a pickup address, from the remote data processing resource; and picking up the package at the pickup address, by way of the autonomous vehicle with guidance by the vehicle navigation system.

17. The package securing system in accordance with claim 13, further comprises:

a package tag is associated with the package;

a vehicle camera is operationally related to the vehicle web-enabled control system, the vehicle memory is encoded with instructions that when executed by the vehicle microcontroller performs the steps of:

creating, by way of the vehicle camera, a second digital tag image of the package tag;

communicating the second digital tag image to the remote data processing resource;

receiving the pickup address from the remote data processing resource;

programming the vehicle navigation system with the pickup address; and picking up the package, from the pickup address, by way of the autonomous vehicle with guidance by the vehicle navigation system.

* * * * *